United States Patent
Visser et al.

(10) Patent No.: US 10,379,534 B2
(45) Date of Patent: Aug. 13, 2019

(54) DRONE FLIGHT CONTROL

(71) Applicant: QUALCOMM Incorporated, San Diego, CA (US)

(72) Inventors: Erik Visser, San Diego, CA (US); Lae-Hoon Kim, San Diego, CA (US); Ricardo De Jesus Bernal Castillo, San Diego, CA (US); Shuhua Zhang, San Diego, CA (US); Raghuveer Peri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 261 days.

(21) Appl. No.: 15/186,215

(22) Filed: Jun. 17, 2016

(65) Prior Publication Data
US 2017/0220036 A1    Aug. 3, 2017

Related U.S. Application Data

(60) Provisional application No. 62/288,351, filed on Jan. 28, 2016.

(51) Int. Cl.
*G05D 1/00* (2006.01)
*B64C 39/02* (2006.01)
(Continued)

(52) U.S. Cl.
CPC .......... *G05D 1/005* (2013.01); *B64C 39/024* (2013.01); *G05D 1/0038* (2013.01); *G05D 1/0094* (2013.01); *G05D 1/0808* (2013.01); *G05D 1/101* (2013.01); *G08C 23/02* (2013.01); *H04R 1/245* (2013.01); *H04R 1/406* (2013.01); *H04R 29/004* (2013.01); *B64C 2201/027* (2013.01);
(Continued)

(58) Field of Classification Search
CPC ...... G05D 1/005; G08C 23/02; H04R 29/004; H04R 2430/20; B64C 39/024; B64C 2201/127; B64C 2201/146
USPC .......................................................... 701/2
See application file for complete search history.

(56) References Cited

U.S. PATENT DOCUMENTS 3,964,694 A     6/1976  Metzger et al.
8,909,391 B1 *  12/2014 Peeters ................ G05D 1/0027
                                                   701/2
(Continued)

FOREIGN PATENT DOCUMENTS

CN          202345914 U       7/2012
CN          202383520 U       8/2012
(Continued)

OTHER PUBLICATIONS

Basiri M., et al., "Robust Acoustic Source Localization of Emergency Signals from Micro Air Vehicles", Intelligent Robots and Systems (IROS), 2012 IEEE/RSJ International Conference on, IEEE, Oct. 7, 2012, XP032287454, pp. 4737-4742.
(Continued)

*Primary Examiner* — Christian Chace
*Assistant Examiner* — Rodney P King
(74) *Attorney, Agent, or Firm* — Shumaker & Sieffert, P.A.

(57) ABSTRACT

A drone system and method. Audio signals are received via one or more microphones positioned relative to a location on a drone and one or more of the audio signals are identified as of interest. Flight characteristics of the drone are then controlled based on the audio signals that are of interest.

28 Claims, 21 Drawing Sheets

(51) Int. Cl.
    *H04R 29/00* (2006.01)
    *G08C 23/02* (2006.01)
    *H04R 1/24* (2006.01)
    *H04R 1/40* (2006.01)
    *G05D 1/08* (2006.01)
    *G05D 1/10* (2006.01)
    *G10L 21/0216* (2013.01)

(52) U.S. Cl.
    CPC .. *B64C 2201/108* (2013.01); *B64C 2201/126* (2013.01); *B64C 2201/127* (2013.01); *B64C 2201/146* (2013.01); *G10L 2021/02166* (2013.01); *H04R 2201/401* (2013.01); *H04R 2430/20* (2013.01)

(56) References Cited

U.S. PATENT DOCUMENTS

| | | | |
|---|---|---|---|
| 9,146,295 | B2 | 9/2015 | Jiang et al. |
| 9,291,697 | B2 | 3/2016 | Kim et al. |
| 2005/0271221 | A1 | 12/2005 | Cerwin |
| 2013/0185078 | A1* | 7/2013 | Tzirkel-Hancock .... G10L 15/22 704/275 |
| 2014/0337842 | A1* | 11/2014 | Hyde ................. H04W 76/023 718/1 |
| 2015/0041598 | A1* | 2/2015 | Nugent .................. H02J 17/00 244/53 R |
| 2015/0097951 | A1* | 4/2015 | Barrows ............ H04N 5/35572 348/144 |
| 2015/0346722 | A1 | 12/2015 | Herz et al. |
| 2015/0350614 | A1 | 12/2015 | Meier et al. |

FOREIGN PATENT DOCUMENTS

| | | |
|---|---|---|
| DE | 102004059228 B3 | 8/2006 |
| EP | 2667216 A1 | 11/2013 |
| EP | 2909689 A2 | 8/2015 |
| GB | 2309301 A | 7/1997 |
| WO | 2011114059 A1 | 9/2011 |
| WO | 2014064431 A2 | 5/2014 |

OTHER PUBLICATIONS

International Search Report and Written Opinion—PCT/US2016/063157—ISA/EPO—dated Feb. 20, 2017 16 pages.

Okutani K., et al., "Outdoor Auditory Scene Analysis Using a Moving Microphone Array Embedded in a Quadrocopter", Intelligent Robots and Systems (IROS), 2012 IEEE/RSJ International Conference on, IEEE, Oct. 7, 2012, XP032287840, pp. 3288-3293.

Yoon S., et al., "Advanced Sound Capturing Method with Adaptive Noise Reduction System for Broadcasting Multicopters", 2015, IEEE, International Conference on Consumer Electronics (ICCE), IEEE, Jan. 9, 2015, XP032749817, pp. 26-29.

Response to Written Opinion dated Feb. 20, 2017, from International Application No. PCT/US2016/063157, filed on Nov. 28, 2017, 5 pp.

Second Written Opinion from International Application No. PCT/US2016/063157, dated Jan. 4, 2018, 7 pp.

Furukawa K., et al., "Noise Correlation Matrix Estimation for Improving Sound Source Localization by Multirotor UAV," IEEE/RSJ International Conference on Intelligent Robots and Systems (IROS), 2013, pp. 3943-3948.

Clark, et al., "Tracking and Following a Tagged Leopard Shark with an Autonomous Underwater Vehicle," Wiley Engineering, Journal of Field Robotics, 30(2), Mar. 2013; pp. 309-322.

International Preliminary Report on Patentability of International Application No. PCT/US2016/063157, dated Apr. 20, 2018, 20 pp.

\* cited by examiner

DRONE FLIGHT CONTROL

This application claims the benefit of U.S. Provisional Patent Application No. 62/288,351, filed Jan. 28, 2016, the entire content of which is incorporated herein by reference.

TECHNICAL FIELD

This disclosure relates to techniques for controlling drones.

BACKGROUND

Unmanned aerial vehicles, sometimes called drones, have increasingly become more affordable and more capable, their use has exploded. Drones are being touted for use in package delivery, environmental monitoring and traffic control, but they primarily are used to capture video or still picture images. To-date, it has been very difficult to capture audio signals with a drone. Part of the reason is that drones typically operate a considerable distance from the source of the sound. In addition, any audio signal captured by the drone is degraded by noise from the motors and rotors, and by wind turbulence. One solution is to capture audio signals via a separate microphone (for example, on the remote control) and then add the captured audio signal to video captured by the drone. It can be difficult, however, to synchronize the audio signal and video, however, due to latency issues between the drone and the microphone.

SUMMARY

In some examples, this disclosure describes techniques for controlling the flight characteristics of a drone via audio signals received from audio sources.

In one example, a method includes receiving audio signals via one or more microphones positioned relative to a location on a drone, identifying audio signals that are of interest, and controlling flight characteristics of the drone based on the audio signals that are of interest.

In another example, a nonvolatile computer-readable storage medium has instructions stored thereon that, when executed, cause one or more processors to receive audio signals via one or more microphones positioned relative to a location on a drone, identify audio signals that are of interest, and control flight characteristics of the drone based on the audio signals that are of interest.

In another example, a drone remote control includes at least one processor, a receiver, a transmitter, and a nonvolatile computer-readable storage medium storing instructions that are executable by the at least one processor to receive audio signal information representing audio signals received by a drone, identify, based on the audio signal information, one or more audio signals that are of interest, and control flight characteristics of the drone based on the audio signals that are of interest.

In yet another example, a drone includes a processor, a plurality of microphones, a receiver, a transmitter and a nonvolatile computer-readable storage medium storing instructions that are executable by the processor to receive audio signals via the microphones, identify audio signals that are of interest, and control flight characteristics of the drone based on the audio signals that are of interest.

The details of one or more examples are set forth in the accompanying drawings and the description below. Other features, objects, and advantages will be apparent from the description and drawings, and from the claims.

DETAILED DESCRIPTION

Flight control for a drone runs the gamut from Global Positioning Satellite (GPS) enabled autopilot systems flown via two-way telemetry links to basic stabilization systems that react to a remote control. This disclosure describes a system and method for controlling flight characteristics of a drone based on audio signals received in the vicinity of the drone. Each audio signal may be generated by one or more audio sources. Drones have a number of self-generated noise sources, ranging from rotor noise through wind noise. In this disclosure, a number of ways are described for reducing the effect of self-generated noise and increasing the signal-to-noise ratio of audio signals of interest. For instance, a drone having one or more microphones may be positioned to enhance audio signal quality from particular audio sources in view of self-generated noise. In another example, microphones on a drone are positioned with respect to noise sources on the drone to enhance audio signal quality with respect to self-generated noise.

Still further, a system and method for positioning microphones to enhance the audio signal quality of audio signals received in the vicinity of the drone is described. In one example approach, an audio source is identified and the audio signal received from that audio source is modified to enhance the audio signal quality of the audio signal from that audio source in view of the self-generated noise on the part of the drone. In one such example approach, a direction of arrival (DOA) is determined for the audio signal emanating from the audio source and beam forming is used to enhance the audio signal captured from the audio source. In some example approaches, a phase difference plot is used to present to a user a selection of audio sources and the user selects a audio source from the phase difference plot as a target of interest. In some such example approaches, the drone is directed to change its orientation or its position relative to the target of interest to separate the audio signal from the target from the self-generated noise of the drone. The phase difference plot is one way to display a direction of arrival of a signal of interest. Other time domain or frequency domain approaches may be used as well to determine and display the DOAs of audio signals in the presence of self-generated noise.

Figure 1:
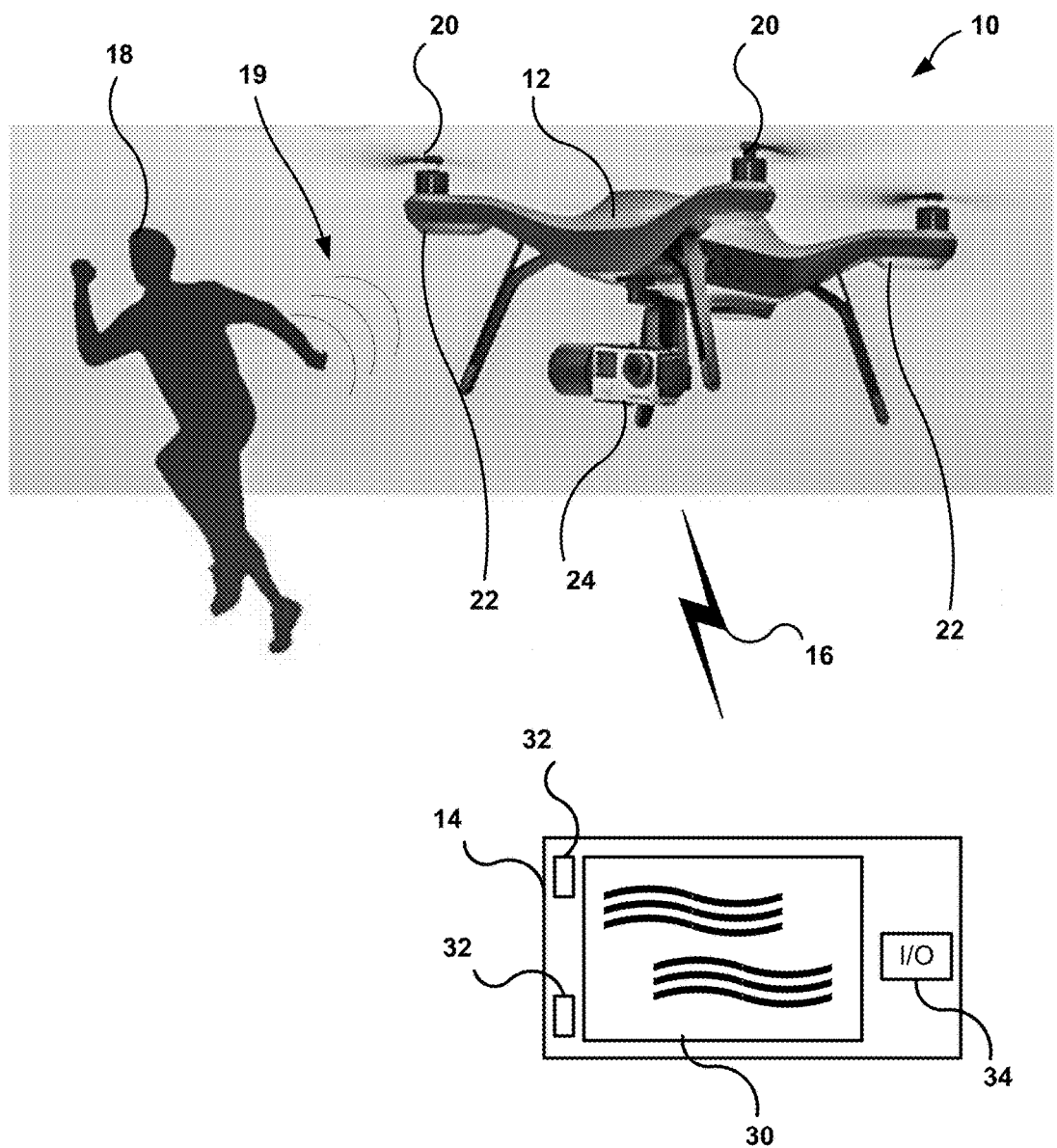
FIG. 1 illustrates a drone flight control system that controls flight characteristics of a drone, in accordance with one or more techniques of this disclosure.

FIG. 1 illustrates a drone flight control system that controls flight characteristics of a drone, in accordance with one or more techniques of this disclosure. In the example approach of FIG. 1, drone flight control system 10 includes a drone 12 communicatively connected to a drone remote control 14 over a communications link 16. In one example approach, communications link 16 is a wireless communications link.

In the example approach of FIG. 1, drone 12 includes one or more rotors 20, one or more microphones 22 and one or more cameras 24. In one such example approach, images, video and audio captured by the cameras 24 and the microphones 22 may be transmitted via link 16 to drone remote control 14 such that the images, video and audio may be seen and heard at drone remote control 14. In one example approach, drone remote control 14 includes a display 30, speakers 32 and an input/output (I/O) interface 34. In one such example approach, display 30 is a touchscreen display.

In one example approach, a runner running a marathon desires a video of his race. The runner (i.e., the target of interest (target 18) in FIG. 1) emits audio signals by periodically shouting or by activating a sound generating device such as a beeper that beeps periodically. In one example approach, the audio signals are captured and tracked by drone 12. In one such example approach, audio signals 19 emitted by or in the vicinity of target 18 are received by drone 12, processed and used to control flight characteristics of drone 12. In some examples, the audio signal corresponding to the runner are identified and microphones on the drone are positioned relative to the runner to improve the quality of the audio signals being captured and to reduce the impact of ambient noise on the audio signals of interest.

In another such example, audio signals 19 emitted by or in the vicinity of target 18 are received by drone 12, processed and transmitted to drone remote control 14 via link 16. Drone remote control 14 then uses the received audio signals to develop commands used to control the flight characteristics of drone 12. In some such examples, a user identifies the audio signal of interest in a representation of the captured audio signals and microphones on the drone are positioned relative to the generator of the signal of interest to improve the quality of the audio signals or to reduce the impact of ambient noise on the signal of interest.

In one example approach microphones 22 are located under rotors 20 and are protected by baffling and shielding from direct rotor noise. In another example approach, microphones 22 are placed adjacent camera(s) 24. In yet another example approach, microphones 22 are located up under the body of drone 12 and are protected by sound proofing material and shielding. In yet another example approach, camera 24 is placed relative to microphones 22 such that when camera 24 is pointing at a target of interest, microphones 22 are positioned for maximum separation from noise sources of drone 12 (such as the rotors 20).

In one example approach, one or more of the cameras 24 are connected to a swivel and can rotate independent of the drone body. In one such example approach, one or more microphones 22 are attached to each of one or more cameras 24 and rotate with the cameras.

In one example approach, three of more microphones 22 are positioned so as to place an audio source in three dimensions. In one such example embodiment, the microphones 22 are positioned such that one or more of the microphones 22 can change position relative to the drone body.

Communications link 16 may comprise any type of medium or device capable of moving the received audio signal data from drone 12 to drone remote control 14. In one example, link 16 may comprise a communication medium that enables source device 12 to transmit received audio signal data directly to drone remote control 14 in real-time. The received audio signal data may be modulated according to a communication standard, such as a wireless communication protocol, and transmitted to drone remote control 14. The communication medium may comprise any wireless or wired communication medium, such as a radio frequency (RF) spectrum or one or more physical transmission lines. In one approach, the communication medium may form part of a packet-based network, such as a local area network, a wide-area network, or a global network such as the Internet. The communication medium may include routers, switches, base stations, or any other equipment that may be useful to facilitate communication between drone 12 and drone remote control 14.

Figure 2:
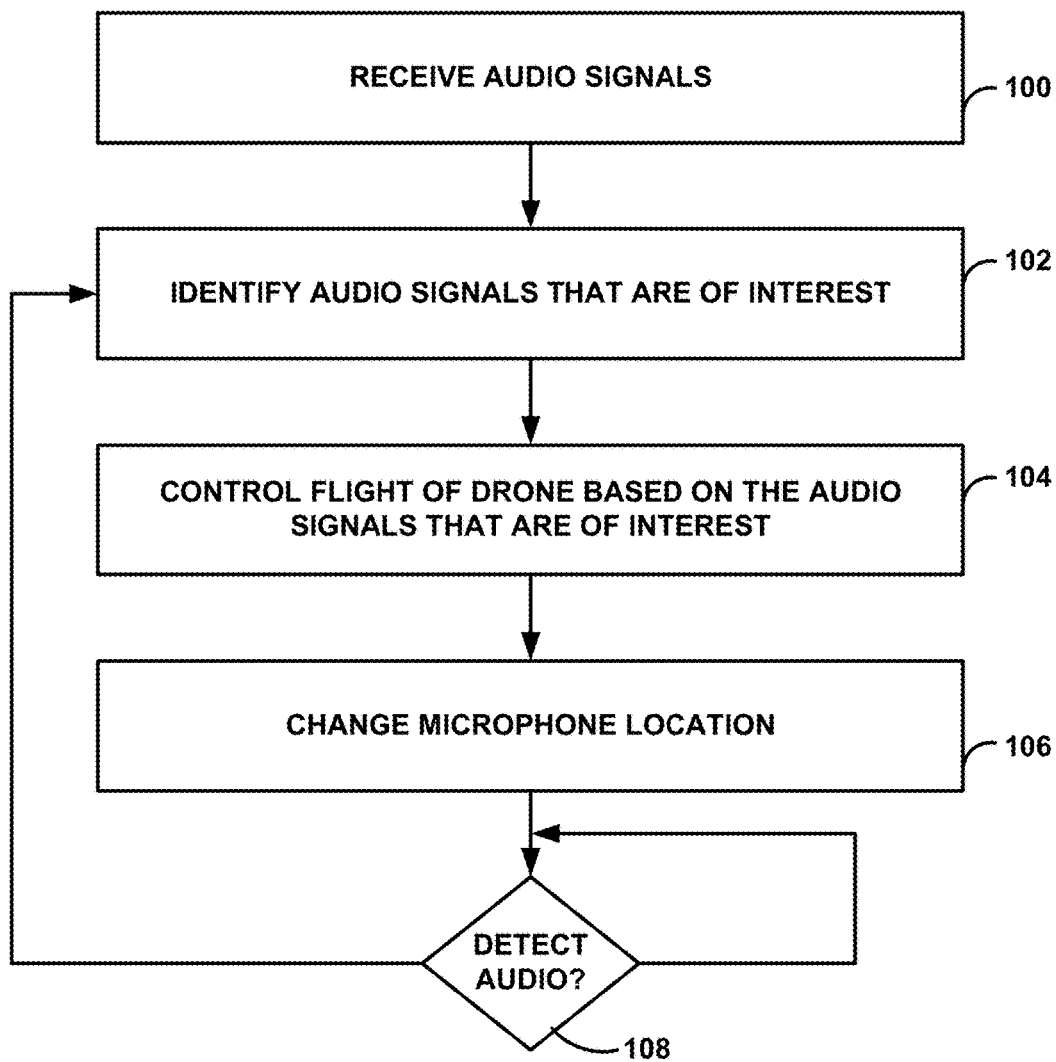
FIG. 2 is a flowchart illustrating a technique for controlling the flight characteristics of a drone, in accordance with one or more techniques of this disclosure.

FIG. 2 is a flowchart illustrating a technique for controlling the flight characteristics of a drone, in accordance with one or more techniques of this disclosure. In the flowchart of FIG. 2, audio signals are received and, in some examples, recorded by an audio recording device (100). The received audio signals are analyzed and one or more of the received audio signals are identified as audio signals that are of interest (102). Flight characteristics of the drone 12 are then controlled via the audio signals that are of interest (104). In some example approaches, the audio recording device is drone 12 and the audio signal received is captured by microphones 22. In other example approaches, the audio recording device is drone remote control 14 and the audio signal received is captured via microphones connected to drone remote control 14. In yet other example approaches, the audio signal is captured by microphones remote from either drone 12 or drone remote control 14 and recorded either by drone 12 or drone remote control 14.

In one example approach, drone 12 moves microphone 22 periodically so that sound arriving at microphone 22 changes its direction of arrival (106). In one example approach, the microphone's location is changed by rotating microphone 22 relative to the drone's body. In other example approaches, the microphone's location relative to audio sources is changed by moving drone 12 in space, or by rotating drone 12. A check is made at 108 to determine if there are any audio signals of interest and, if so, control moves to 102, where the received audio signals are analyzed and one or more of the received audio signals are identified as audio signals that are of interest.

Figure 3:
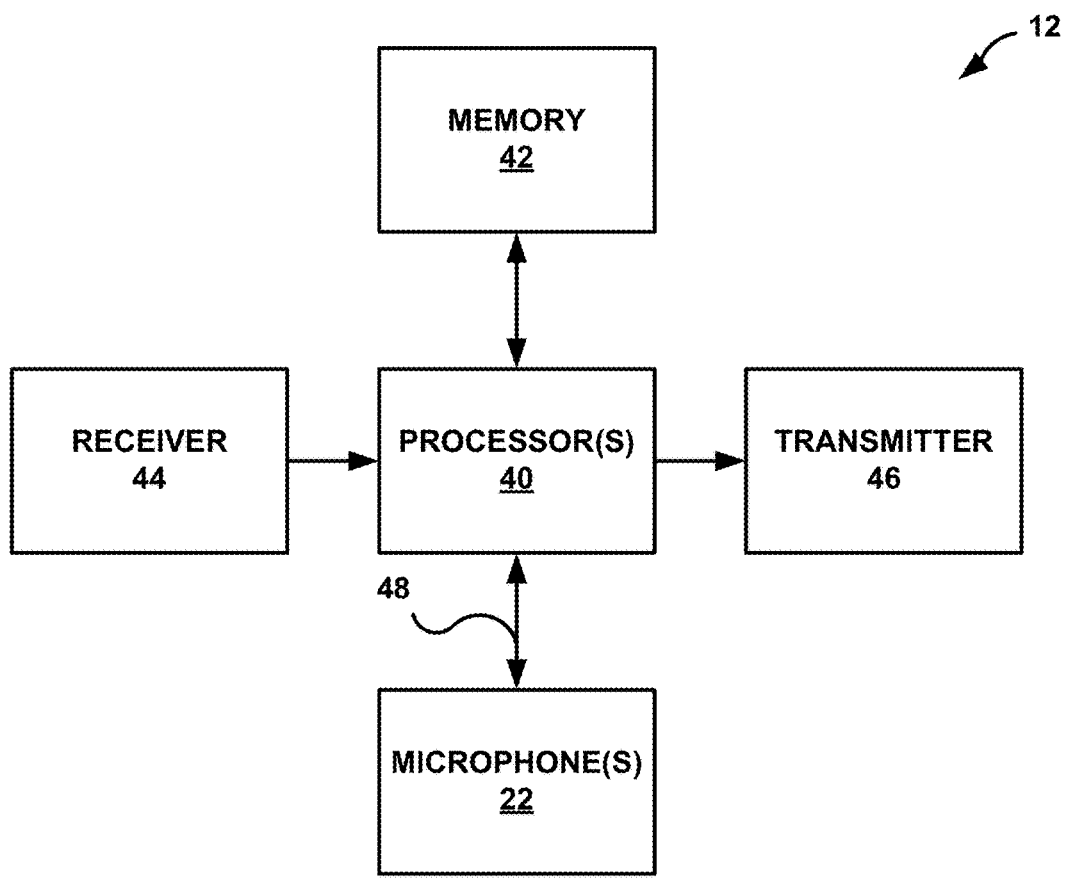
FIG. 3 is a conceptual diagram for one example approach to the drone of FIG. 1, in accordance with one or more techniques of this disclosure.

FIG. 3 is a conceptual diagram for one example approach to the drone of FIG. 1, in accordance with one or more techniques of this disclosure. In the example approach of FIG. 3, drone 12 includes one or more processors 40 connected to a memory 42, one or more microphones 22, a receiver 44 and a transmitter 46. In one such example approach, drone 12 communicates with drone remote control 14 via receiver 44 and transmitter 46 over link 16. In one example approach, microphones 22 are connected to the body of the drone. In other example approaches, microphones 22 are placed at locations separate from drone 12 and transmit a signal representative of the received audio signal to drone 12 via wired or wireless communication link 48.

Figure 4:
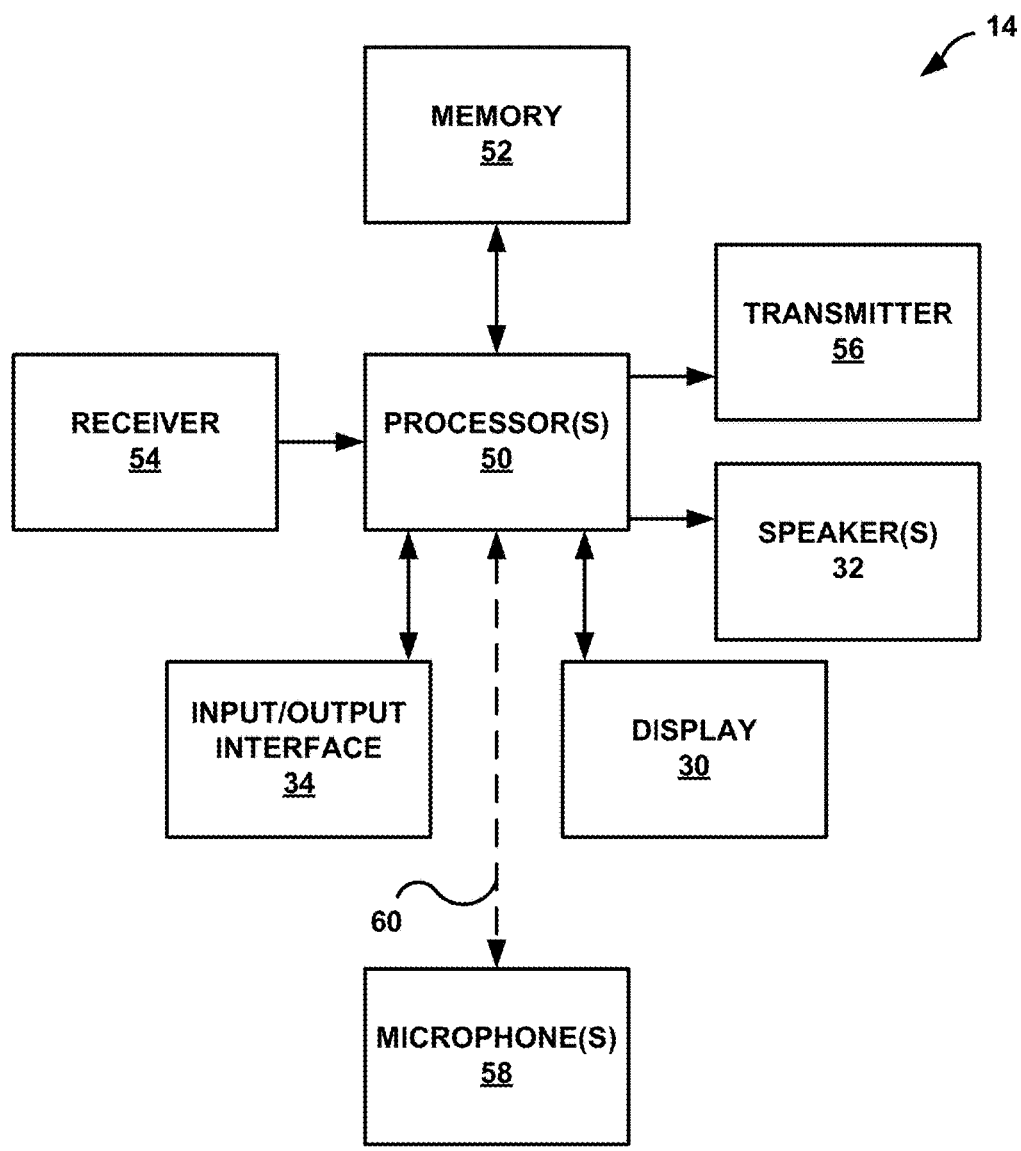
FIG. 4 is a conceptual diagram for one example approach to the drone remote control of FIG. 1, in accordance with one or more techniques of this disclosure.

FIG. 4 is a conceptual diagram for one example approach to the drone remote control of FIG. 1, in accordance with one or more techniques of this disclosure. In the example approach of FIG. 4, drone remote control 14 includes one or more processors 50 connected to a display 30, one or more speakers 32, an input/output interface 34, a memory 52, a receiver 54, and a transmitter 56. In one such example approach, drone remote control 14 also is attached via a wired or wireless link to one or more microphones 58. In one such example approach, drone 12 communicates with drone remote control 14 via receiver 54 and transmitter 56 over link 16. In one example approach, microphones 58 are connected to the body of drone remote control 14. In other example approaches, microphones 58 are placed at locations separate from drone remote control 14 and transmit a signal representative of the received audio signal to drone remote control 14 via wired or wireless communication link 60.

In one example approach, microphones 22 receive an audio signal from target 18 and one or more of the processors 40 store data representing the received audio signal to memory 42. In one such example approach, the data stored in memory 42 is analyzed and enhanced, and the data representative of the enhanced data is transmitted to drone remote control 14. In one such example approach, processor 50 receives the audio signal data and stores the received audio signal data in memory 52. Processor 50 then displays data representative of the enhanced audio signal data on display 30, receives via a user interface (e.g., I/O interface 34) user input selecting audio signals of interest and transmits an indication of the selected audio signals of interest to drone 12. In another such example approach, display 30 is a touchscreen display. Drone remote control 14 displays within touchscreen display 30 data representative of the enhanced audio signal data, receives via touchscreen display 30 user input selecting audio signals of interest and transmits an indication of the selected audio signals of interest to drone 12.

In another example approach, one or more of the processors 40 of drone 12 forward all or some of the received audio signals to drone remote control 14 via link 16. Processor 50 of drone remote control 14 stores the received audio signals in memory 52 and analyzes and enhances the data before displaying the data on display 30. In one such example approach, drone remote control 14 displays within display 30 data representative of the enhanced audio signal data, receives via a user interface (e.g., I/O interface 34) user input selecting audio signals of interest and transmits an indication of the selected audio signals of interest to drone 12. In another such example approach, as noted above, display 30 is a touchscreen display. Drone remote control 14 displays within touchscreen display 30 data representative of the enhanced audio signal data, receives via touchscreen display 30 user input selecting audio signals of interest and transmits an indication of the selected audio signals of interest to drone 12.

In yet another example approach, data representing audio signals received at microphones 22 is combined with audio signals received at microphones 58 to arrive at audio signals representative of the audio environment of system 10. In one such example approach, one or more of the processors 50 of drone remote control 14 receive, process and store in memory 52 data representative of the audio signals received by microphones 22 and data representative of the audio signals received by microphones 58. In one such example approach, drone remote control 14 displays within display 30 data representative of the combined audio signals, receives via a user interface (e.g., I/O interface 34) user input selecting audio signals of interest and transmits an indication of the selected audio signals of interest to drone 12. In another such example approach, as noted above, display 30 is a touchscreen display. In such an approach, drone remote control 14 displays within touchscreen display 30 data representative of the combined audio signals, receives via touchscreen display 30 user input selecting, on touchscreen display 30 audio signals of interest and transmits an indication of the selected audio signals of interest to drone 12.

Figure 5:
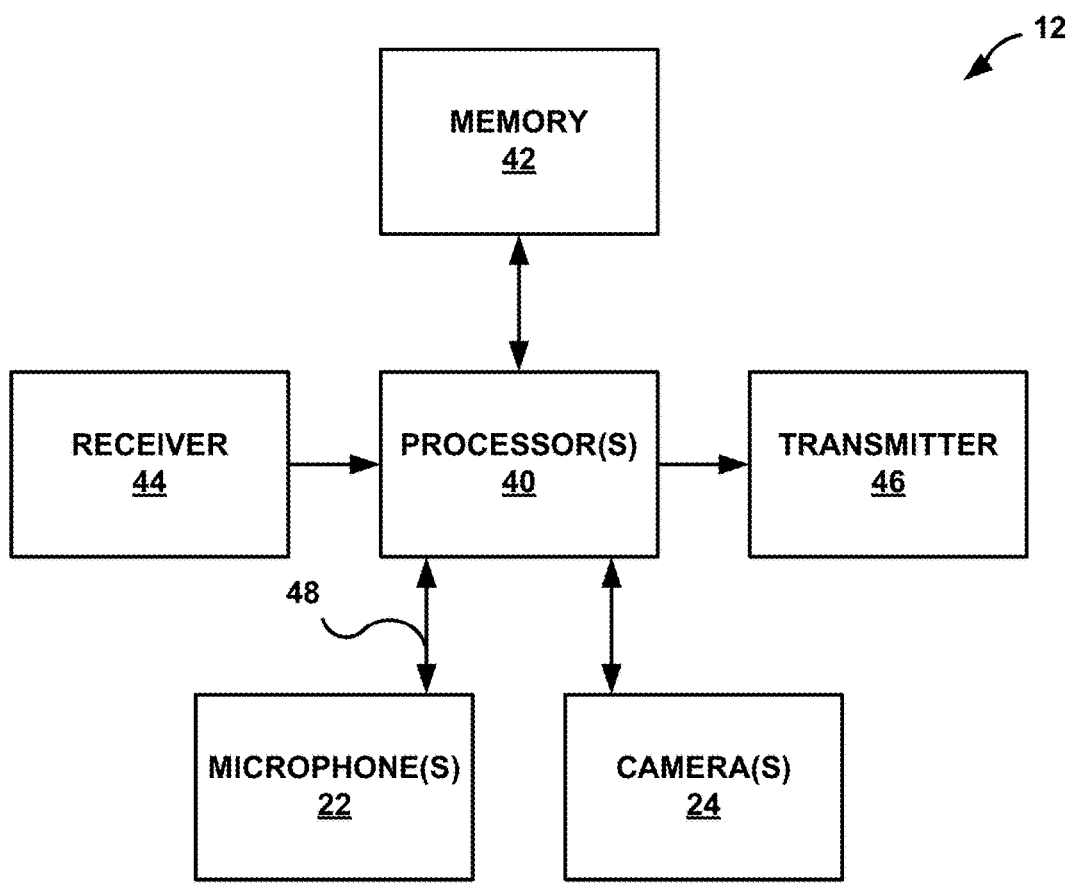
FIG. 5 is a conceptual diagram for another example approach to the drone of FIG. 1, in accordance with one or more techniques of this disclosure.

FIG. 5 is a conceptual diagram for another example approach to the drone of FIG. 1, in accordance with one or more techniques of this disclosure. In the example approach of FIG. 5, drone 12 includes one or more processors 40 connected to a memory 42, to one or more microphones 22, to one or more cameras 24, to a receiver 44 and to a transmitter 46. In one such example approach, drone 12 communicates with drone remote control 14 via receiver 44 and transmitter 46 over link 16. In one example approach, microphones 22 are connected to the body of drone 12. In other example approaches, microphones 22 are placed at locations separate from drone 12 and transmit a signal representative of the received audio signal to drone 12 via wired or wireless communication link 48. In yet another example approach, microphones 22 are mounted in fixed relation to cameras 24 and, in some such approaches, microphones 22 and cameras 24 rotate in relation to the body of drone 12 in order to change the placement of microphones 22 with relation to audio sources associated with drone 12.

Figure 6:
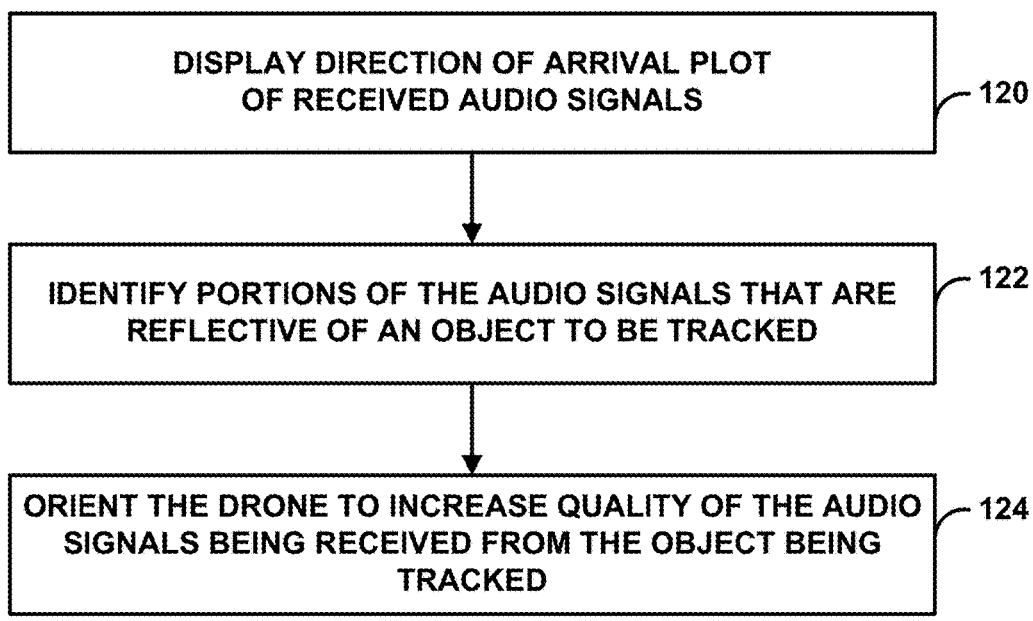
FIG. 6 is a flowchart illustrating a technique for controlling the flight characteristics of a drone to increase the quality of the audio signal received from an audio source, in accordance with one or more techniques of this disclosure.

As noted above in the discussion of FIG. 2, system 10 may control flight characteristics of drone 12 as a function of audio signals received by drone 12, drone remote control 14 and/or other sound capturing devices. FIG. 6 is a flowchart illustrating a technique for controlling the flight characteristics of a drone to increase the quality of the audio signal received from an audio source, in accordance with one or more techniques of this disclosure. In one example approach, this involves positioning the drone relative to any noise sources and to the target of interest to better capture audio signals from the target of interest in the presence of the audio signals from the noise sources.

In the flowchart of FIG. 6, processor 50 of drone remote control 14 displays a direction of arrival (DOA) plot of received audio signals on display 30 (120). A user identifies an audio signal on the DOA plot that is associated with an audio signal received from the desired audio source (122) and instructs system 10 to orient drone 12 to increase the quality of the audio signal received from the desired audio source (124). In one such example approach, processor 50 of drone remote control 14 orients drone 12 to increase the signal to noise ratio of an audio signal received from the desired audio source. In another example approach, processor 50 of drone remote control 14 orients drone 14 to increase the magnitude of the audio signal received from the desired audio source, or to avoid having a DOA fall within the DOA region of a noise source. Other measures of quality can be used as well to orient drone 12. In one example approach, processor 50 of drone remote control 14 instructs processor 40 of drone 12 to increase the quality of the audio signal from the desired audio source and processor 40 determines appropriate orientations of drone 12.

In one example approach, microphones 22 are mounted to drone 12 via mechanism that allows one to move the microphone relative to a point on drone 12. In one approach, the microphones are located on a platter approximately parallel to a plane drawn through rotors 20. In one such approach, the platter can be rotated to change the orientation of microphones 22 relative to points on drone 12. In one such approach, camera 24 is also mounted to the platter and can be rotated without changing the orientation, attitude or location of drone 12. In one such approach, system 10 orients drone 12 relative to a audio source via movements of drone 12 and movements of the microphones 22 attached to the platter under drone 12.

In one example approach, microphones 22 and/or cameras 24 are mounted to a mechanism suspended under drone 12 that allows movement in multiple dimensions relative to the body of drone 12. In one such approach, system 10 orients drone 12 relative to a audio source via movements of drone 12 and movements of the microphones 22 suspended under drone 12.

Figure 7:
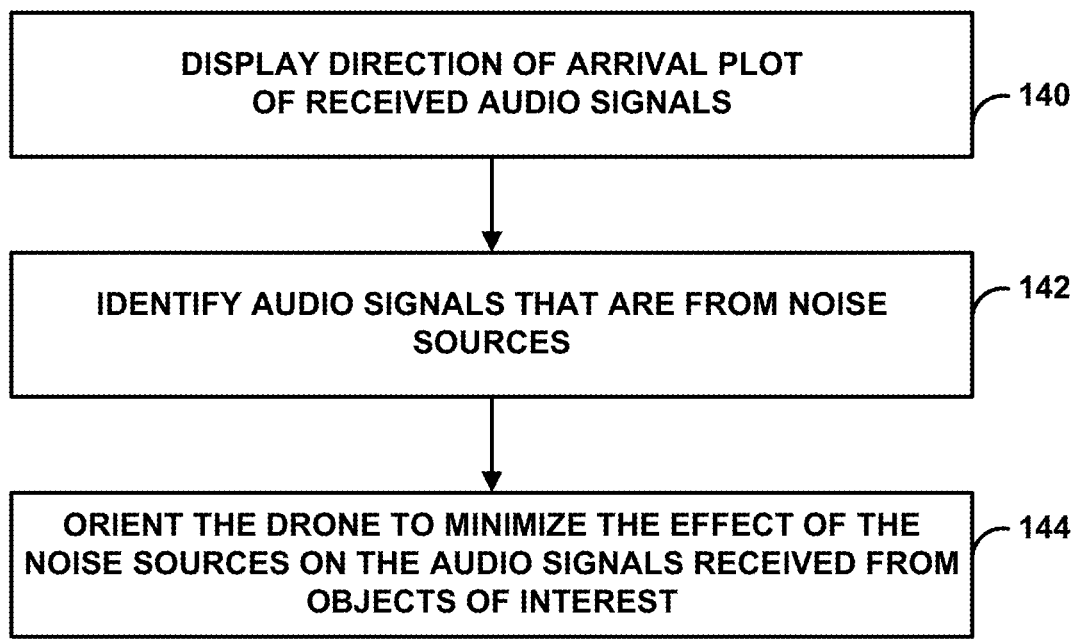
FIG. 7 is a flowchart illustrating a technique for controlling the flight characteristics of a drone to reduce the contribution of noise sources in the received audio signal, in accordance with one or more techniques of this disclosure.

FIG. 7 is a flowchart illustrating a technique for controlling the flight characteristics of a drone to reduce the contribution of noise sources to the received audio signal, in accordance with one or more techniques of this disclosure. In the flowchart of FIG. 7, processor 50 of drone remote control 14 displays a direction of arrival (DOA) plot of received audio signals on display 30 (140). System 10 (with or without input from a user) identifies one or more of the received audio signals on the DOA plot that are from noise sources (142) and instructs drone 12 to orient itself so as to minimize the effect, on the audio signals received from objects of interest, of the noise sources (144). In one example approach, processors 40 and/or 50 identify audio signal contributions from common noise sources (e.g., rotor noise and wind noise) and treat one or more other audio sources as desired audio sources. Drone 12 is then oriented to enhance the audio signals received from the desired audio sources. In one such example approach, system 10 looks to the highest powered non-noise source as the desired signal. In another example approach, audio signals from desired audio sources has a characteristic that can be used to identify the audio source as a desired audio source and system 10 monitors for audio signals having that characteristic. In one such example approach, a data dictionary of audio signals of interest is used to identify audio signals from targets of interest. Techniques such as those discussed above with respect to FIG. 6 are effective in reducing the contribution of selected noise sources to received audio signals.

Figure 8:
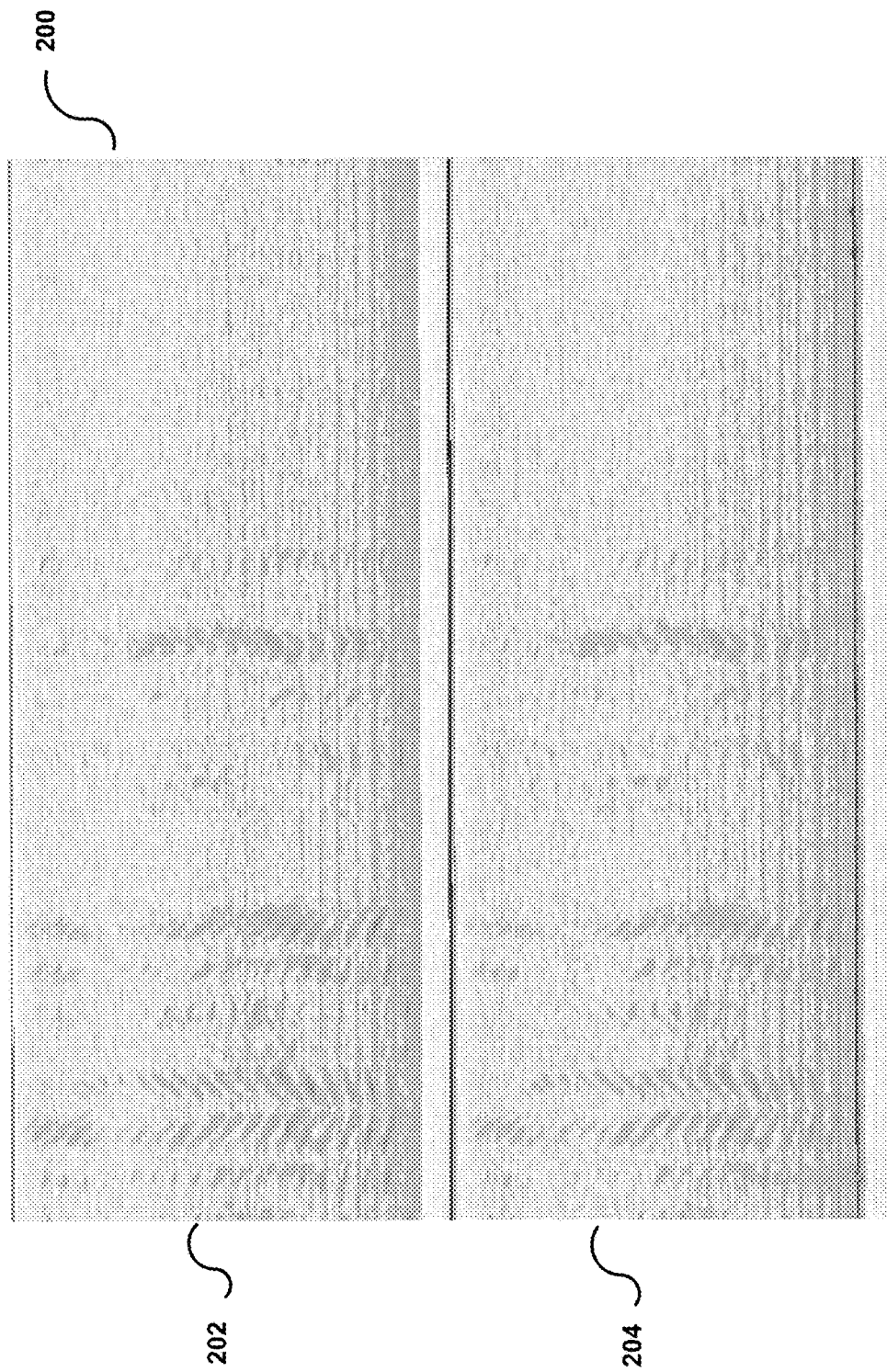
FIG. 8 is an example spectrogram illustrating stereo recording of a drone audio signal with left and right channels, in accordance with one or more techniques of this disclosure.

FIG. 8 is an example spectrogram illustrating stereo recording of a drone audio signal with left and right channels, in accordance with one or more techniques of this disclosure. In the example shown in FIG. 8, spectrogram 200 includes a left channel 202 and a right channel 204. Rotor noise (a large contributor to overall noise in the typical drone 12) is seen in spectrogram 200 as relatively unchanging over time. Wind noise is a consistent lower frequency presence in the spectrogram. Audio signals of interest tend to be those shown as columns in FIG. 8.

Figure 9:
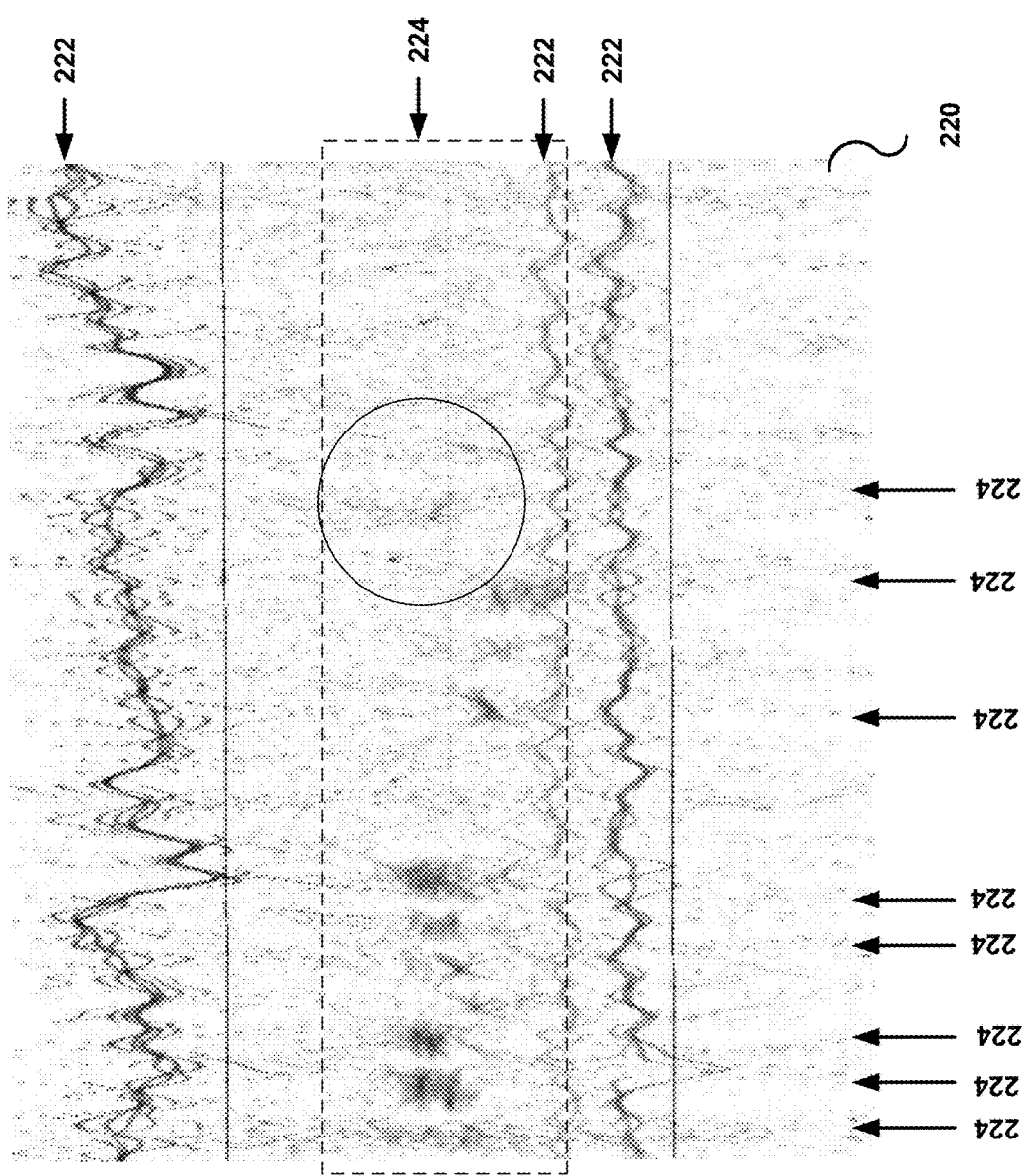
FIG. 9 illustrates an example phase difference plot between left and right channels of a stereo recording by a drone of an audio signal, in accordance with one or more techniques of this disclosure.

FIG. 9 illustrates an example phase difference plot between left and right channels of a stereo recording by a drone of an audio signal, in accordance with one or more techniques of this disclosure. In the example shown in FIG. 9, phase difference plot 220 includes the rotor noise contributions 222 from three rotors 20 and the contributions of instances 224 of speech. In one example approach, null filtering may be used to filter out the rotor noise contributions 22. A particular speech contribution 224 is circled in phase difference plot 220.

Given the spectrogram 200 of FIG. 8 and the phase difference plot 220 of FIG. 9, it is possible to isolate audio signals of interest from the general captured audio signal. In the example shown in FIGS. 8 and 9, one can, with at least two microphones 22 or microphones 58, identify time and frequency points with consistent DOA range and continuous activation in time. These continuous partials are tracked and set to zero; drone 12 records everything else. In the example shown in FIGS. 8 and 9, one may, for instance, filter out the rotor noise contributions 222 of drone rotors 20 and capture the remaining recorded speech 224. In one such example approach, one may change the positioning of the microphones to move a signal of interest out of a region corresponding to a noise source.

Figure 10:
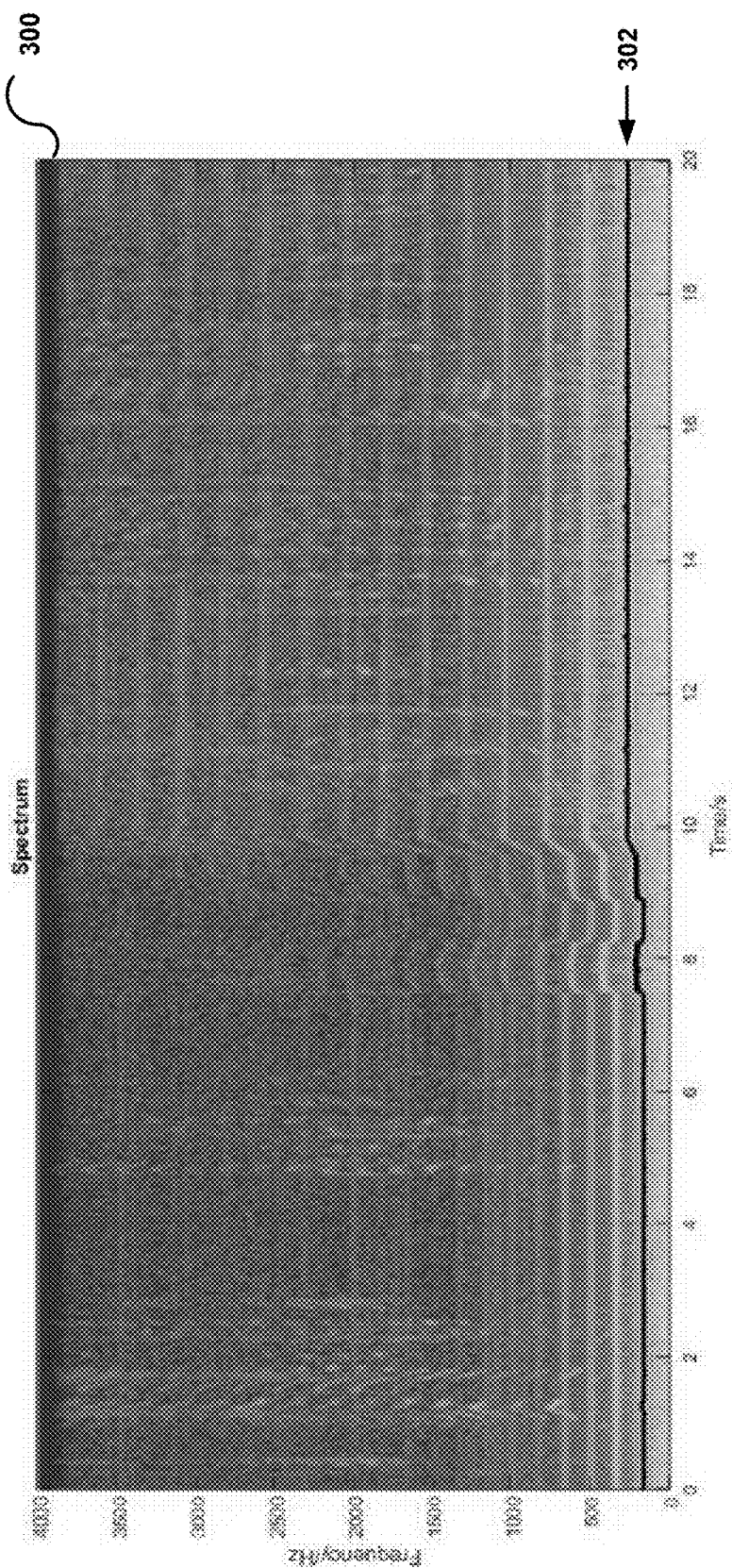
FIG. 10 is a spectrogram illustrating rotor noise as non-stationary harmonic interference, in accordance with one or more techniques of this disclosure.

FIG. 10 is a spectrogram illustrating rotor noise as nonstationary harmonic interference, in accordance with one or more techniques of this disclosure. In the example shown in FIG. 10, spectrogram 300 displays an audio signal as a function of frequency over time. In the example shown in FIG. 10, rotor noise has a frequency $f_0$ (as shown by the black line 302 in FIG. 10). In one example approach, system 10 reduces the effect of rotor noise by warping the spectrum around $f_0$ and filtering the resulting noise contribution.

Figure 11:
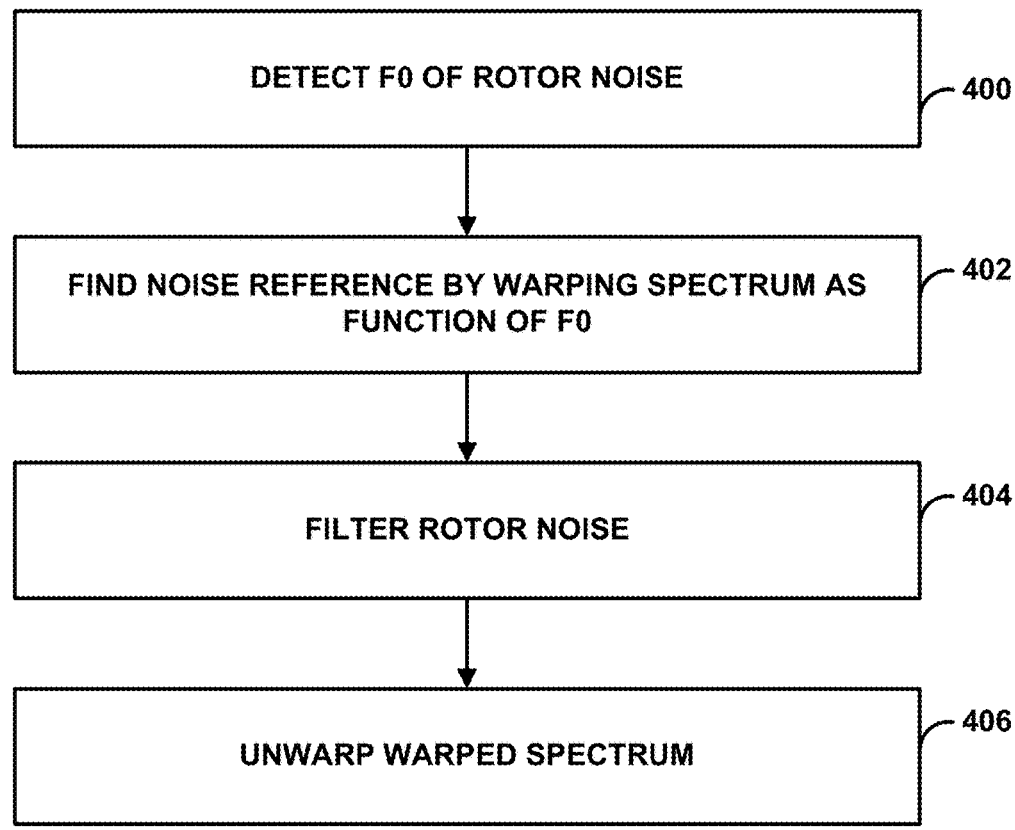
FIG. 11 is a flowchart illustrating a technique for reducing the effect of rotor noise, in accordance with one or more techniques of this disclosure.

FIG. 11 is a flowchart illustrating a technique for reducing the effect of rotor noise, in accordance with one or more techniques of this disclosure. As demonstrated in FIG. 10, in this example rotor noise is centered around a frequency $f_0$ (as shown by the black line 302 in FIG. 10). System 10 determines a frequency $f_0$ for rotor noise at each frame (400). In one example approach, system 10 determines the frequency $f_0$ of the rotor noise from the rotor speed (since frequency $f_0$ is a function of the rotor speed). In another example approach, system 10 determines frequency $f_0$ using spectral analysis. That is, by finding the frequency gap between consecutive spectral peaks of rotor noise. In most approaches, this is only done if rotor speed is not easily accessible.

System 10 then warps the spectrum of the audio signal according to frequency $f_0$ (402). In one example approach, system 10 defines a nominal frequency $\tilde{f}_0$, which may correspond to the typical rotor speed of the drone and warps the spectrum by resampling the magnitude spectrum by the scale $\tilde{f}_0/f_0$, so that the length of a spectrum at the frame changes to $\tilde{f}_0/f_0(N/2+1)$ from $(N/2+1)$, where N is the size of the Fast Fourier Transform (FFT). In one example approach, resampling is done by, for example, quadratic interpolation. While in the warped frequency domain, system 10 identifies and removes the contribution of rotor noise (404) and unwarps the spectrum (406). In one example approach, system 10 unwarps the spectrum by resampling the warped spectrum by the scale $\tilde{f}_0/f_0$.

Figure 12:
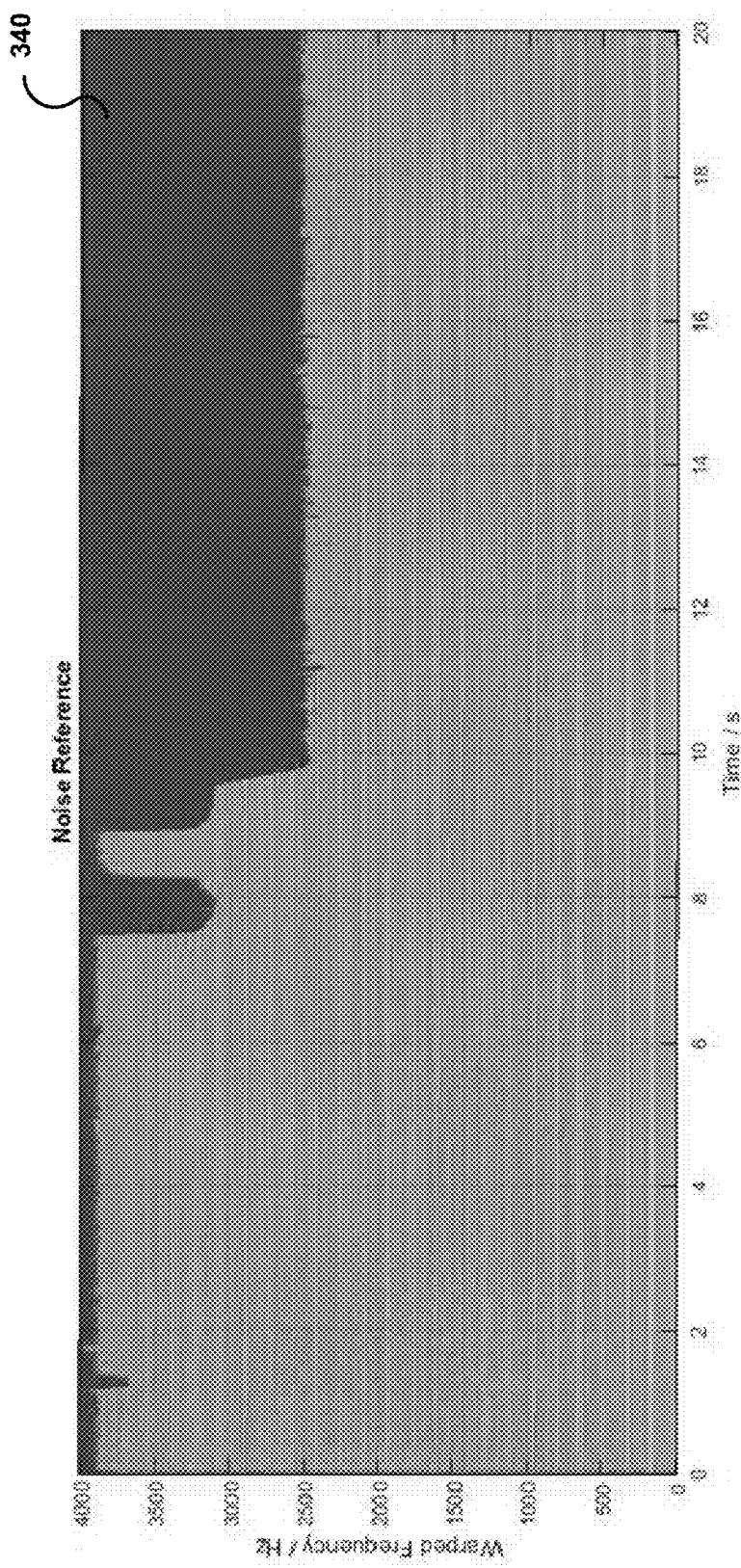
FIG. 12 is a spectrogram illustrating the warping the audio spectrum of FIG. 10, in accordance with one or more techniques of this disclosure.

FIG. 12 is a spectrogram illustrating the warping the audio spectrum of FIG. 10, in accordance with one or more techniques of this disclosure. In the example shown in FIG. 12, audio spectrum 300 is warped as a function of the frequency $f_0$ (302) and of a nominal frequency $\tilde{f}_0$.

Figure 13:
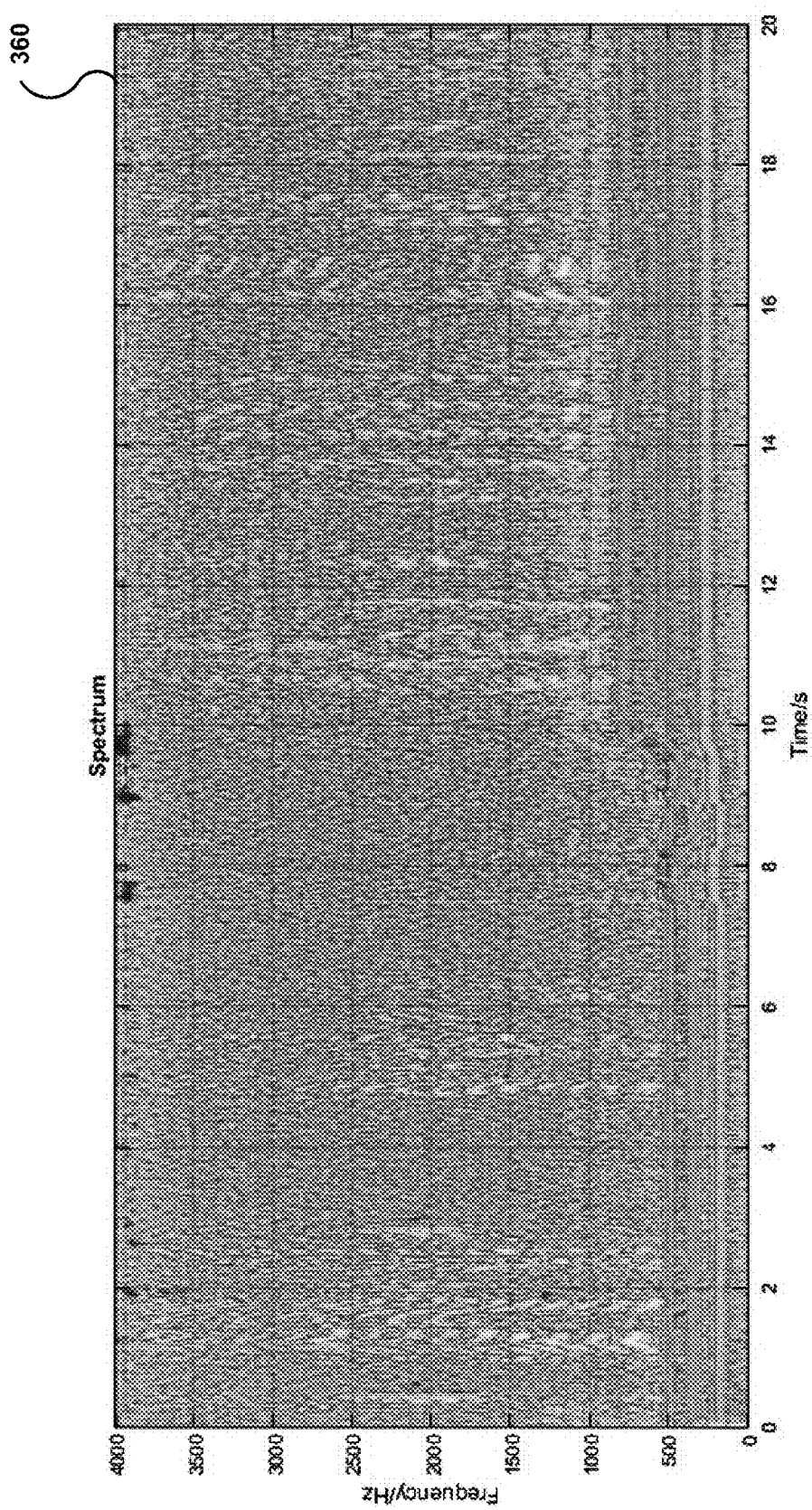
FIG. 13 is a spectrogram illustrating the audio spectrum of FIG. 10 after application of the technique of FIG. 11, in accordance with one or more techniques of this disclosure.

FIG. 13 is a spectrogram illustrating the audio spectrum of FIG. 10 after application of the technique of FIG. 11, in accordance with one or more techniques of this disclosure. In the example shown in FIG. 13, system 10 modifies audio spectrum 340 of FIG. 12 to reduce or remove rotor noise. System 10 then unwarps the resulting filtered warped spectrum as a function of the frequency $f_0$ (302) and of the nominal frequency $\tilde{f}_0$ as described in the discussion of FIG. 11 above. Spectrogram 360 of FIG. 13, illustrates the spectrum of an audio signal after system 10 has filtered and unwarped warped audio spectrum 340.

Returning to FIG. 9, it is desirable to avoid rotor noise DOA regions when attempting to track a target 18 by its sound emissions. Since desired audio signals may crossover into rotor noise DOA regions, it is helpful for drone 12 or drone remote control 14 to automatically position drone 12 so audio signals captured from tracked targets 18 stays outside rotor noise DOA lines. In one approach, a user selects audio signals of interest in a DOA plot 220. For instance, in the example illustrated in FIG. 9, it may be desirable to track the rightmost speech component 224 (inside the circle).

In one example approach, a user identifies a particular audio signal component to be tracked. In one such approach, a user circles the audio signal component of interest on the touchscreen of a smartphone (as shown in FIG. 9). In one example approach, drone 12 receives this information and positions the drone to maximize a quality metric such as a signal to noise ratio for that audio source. In some approaches, this may require that the drone rotate to place its microphones 22 in a particular orientation to rotors 20. In other example approaches, drone 12 may have to move closer to target 18, or change its height to avoid objects between target 18 and drone 12. In one example approach, drone 12 attempts to maintain an orientation, attitude and distance from object 18 that keeps the desired audio signal or signals from crossing into areas of the phase difference plot occupied by rotor DOA lines. In one example approach, system 10 maximizes received audio signal quality by keeping the DOA pickup region of the desired audio signal or signals outside certain phase difference plot areas, such as the rotor DOA regions. In one such example approach, drone 12 follows a target of interest by measuring a magnitude of one of the audio signals received from the target of interest, determining an average magnitude based on the magnitude measured over a last pre-defined period of time and maintaining a position relative to the object of interest to keep the average magnitude within a range of values. In one such approach, drone does this while maintaining separation in the DOAs of the audio signal from the target of interest and the audio signals from other audio sources. In one example approach, drone remote controller performs some or all of the calculations and transmits commands for used by drone 12 to make changes in position and orientation.

Figure 14:
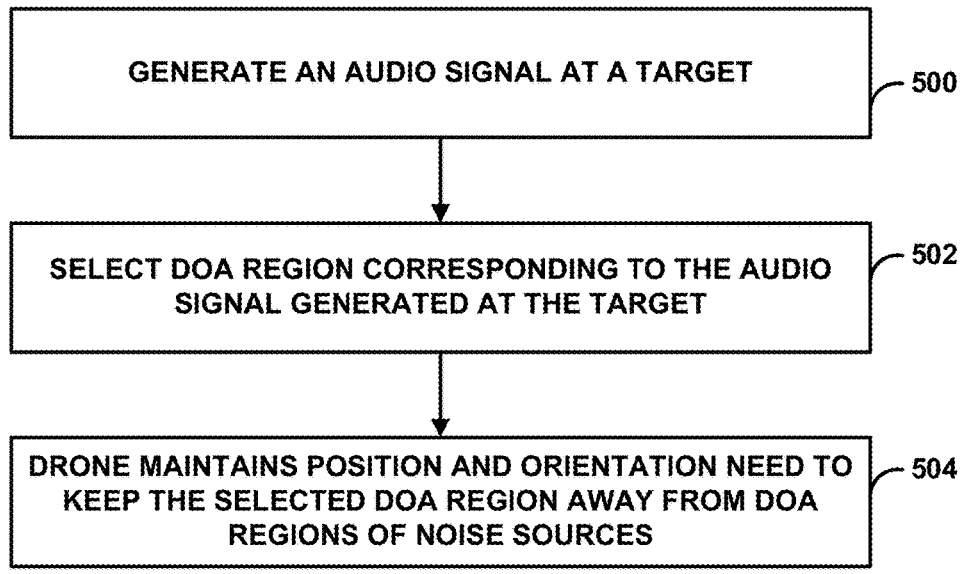
FIG. 14 is a flowchart illustrating a technique for enhancing signal quality of audio signals generated by a target being tracked, in accordance with one or more techniques of this disclosure.

FIG. 14 is a flowchart illustrating a technique for enhancing signal quality of audio signals generated by a target being tracked, in accordance with one or more techniques of this disclosure. In the example approach of FIG. 14, a target 18 generates an audio signal by, for instance, talking or shouting, or by using a noise source (500). A DOA signal corresponding to the generated audio signal is displayed on a display 30 of drone remote control 14 and a user selects the DOA signal region corresponding to the audio signal generated by the target (502). Drone remote control 14 then instructs drone to maintain a position and orientation that will keep the selected DOA region away from DOA regions of noise sources (504). In one example approach, drone 12 follows target 18, keeping at a distance consistent with an average magnitude of an audio signal generated by target 18.

In one example approach, the audio signal generated is outside human hearing range. In one such approach, an audio signal below 20 Hz is followed by drone 12. In another such approach, an audio signal above 20 kHz is followed by drone 12.

In one example approach, drone 12 tracks a target 18 using both an image captured by camera 24 and an audio signal captured by microphones 22. In one such approach, a technique for combining sensor contributions such as a Kalman filter is used to determine distance, orientation and attitude toward target 18.

In one example approach, each drone 12 maintains a dictionary of audio sources of interest. Audio signals received by drone 12 are analyzed against the dictionary of audio sources to determine if any sources have been identified. In one such example approach, if one or more audio sources are identified, their DOA is highlighted in a message sent to drone remote control 14. In another such approach, a priority is assigned to each audio source and drone 12 automatically enhances and highlights audio signals from the highest priority audio source detected using the techniques described above. In one example approach, users can add new representative audio sources via a template.

Figure 15:
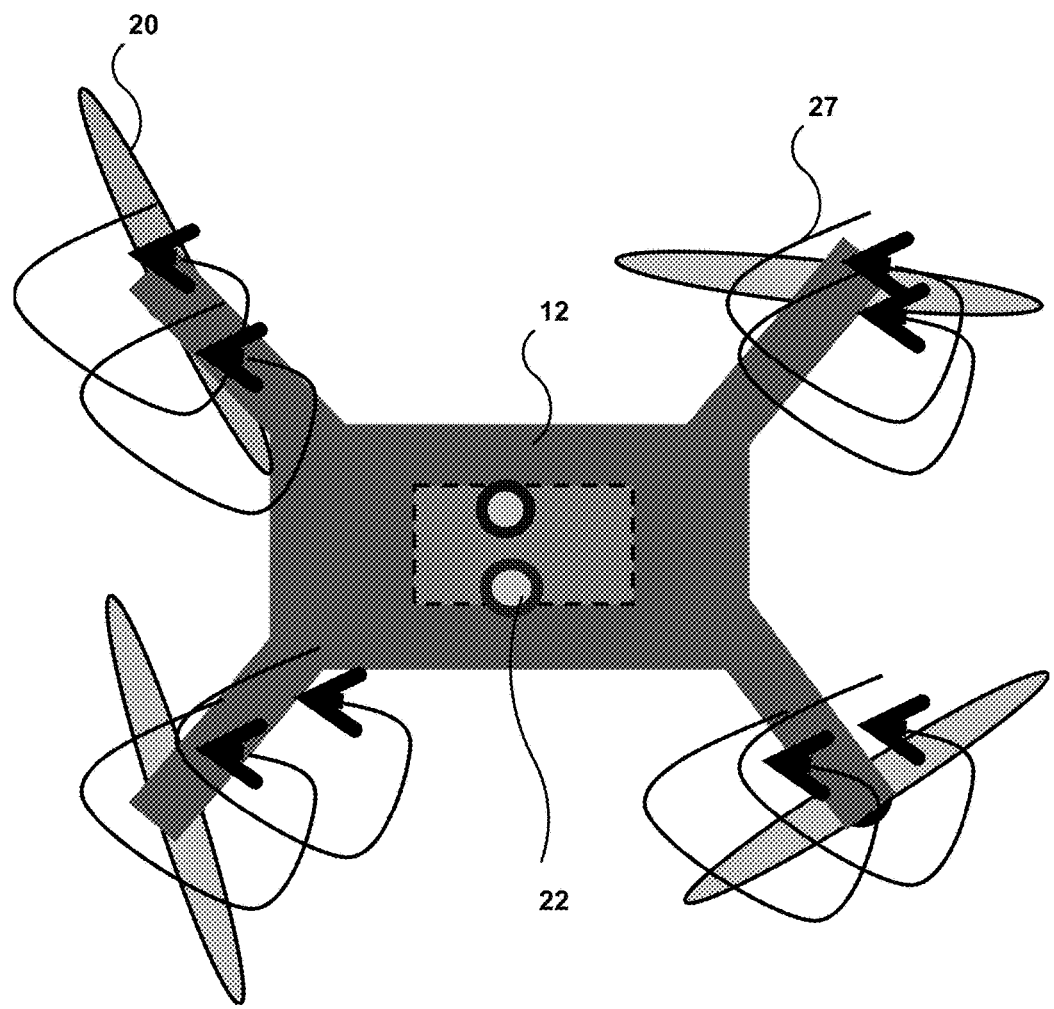
FIG. 15 is a conceptual diagram of one example approach for adding microphones to the drone of FIG. 1, in accordance with one or more techniques of this disclosure.

FIG. 15 is a conceptual diagram of one example approach for adding microphones to the drone of FIG. 1, in accordance with one or more techniques of this disclosure. In the example approach of FIG. 15, the microphones 22 are mounted under the body of drone 12 in order to avoid the turbulence 27 of rotors 20, in accordance with one or more techniques of this disclosure.

Figure 16:
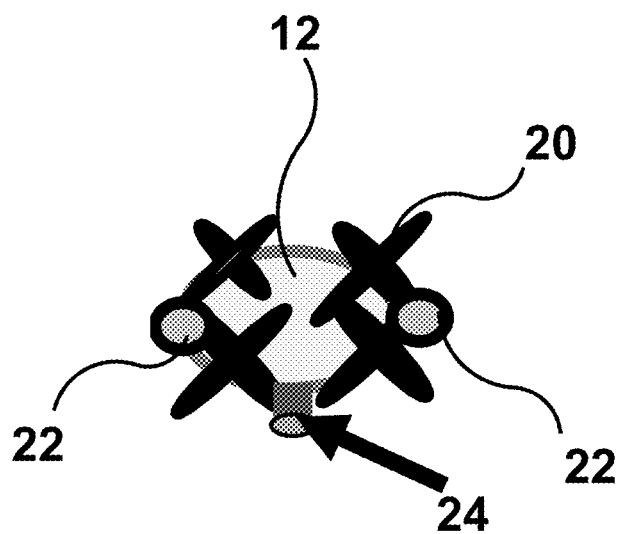
FIG. 16 is a conceptual diagram showing placement of microphones on a drone relative to rotors and a camera, in accordance with one or more techniques of this disclosure.

FIG. 16 is a conceptual diagram showing fixed placement of microphones on a drone relative to rotors 20 and a camera 24. In one example approach, microphones 22 are placed so as to reduce interaction with rotors 20, in accordance with one or more techniques of this disclosure.

Figure 17C:
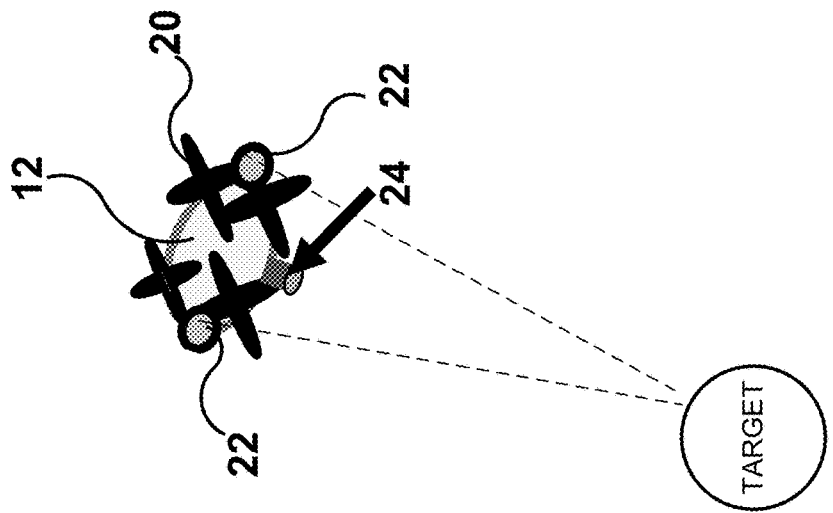
FIGS. 17A-C, 18A-C, 19A and 19B illustrate movement of drone 12 to maintain signal quality according to various configurations of drone 12, in accordance with one or more techniques of this disclosure.
Figure 17B:
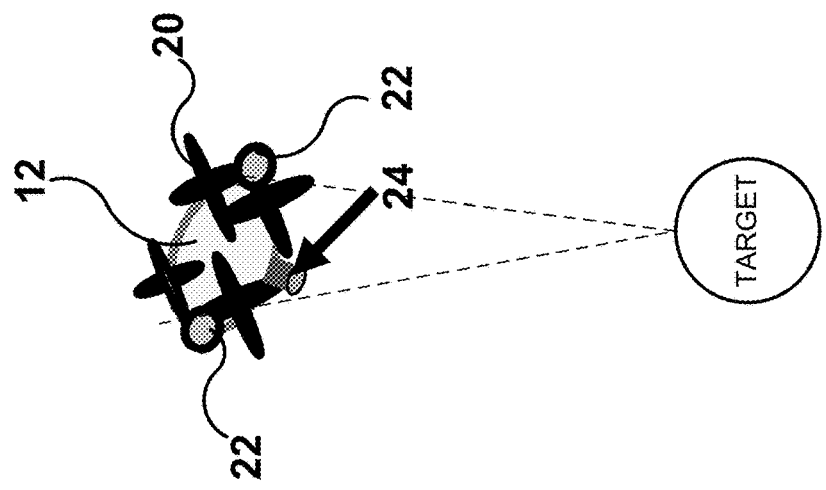
Figure 17A:
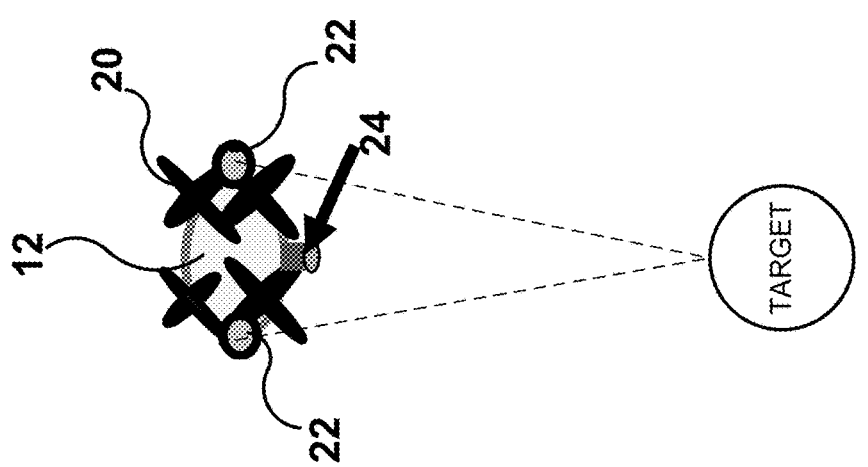

FIGS. 17A-C, 18A-C, 19A and 19B illustrate movement of drone 12 to maintain signal quality according to various configurations of drone 12, in accordance with one or more techniques of this disclosure. FIG. 17A illustrates the positioning of a drone 12 such as the drone of FIG. 16 with a fixed position camera 24 facing the target. The dotted lines show the direct path of sound from the target to each microphone 22 of drone 12. Noise is overlapped with the target sound. FIG. 17B illustrates the positioning of the drone 12 of FIG. 17A with its camera 24 at an angle to the target but in the same position as the drone of FIG. 17A. Once again, the dotted lines show the direct path of sound from the target to each microphone 22 of drone 12. The rotation of drone 12 in FIG. 17B ensures maximum separation of target sound from rotor noise but at the cost of moving the target out of the camera's view. FIG. 17C illustrates the positioning of the drone 12 of FIG. 17A after it has rotated and moved with respect to the target. The dotted lines again show the direct path of sound from the target to each microphone 22 of drone 12. The rotation of drone 12 in FIG. 17C ensures maximum separation of target sound from rotor noise and the move of drone 12 ensures that the target remains in the camera's view.

Figure 18C:
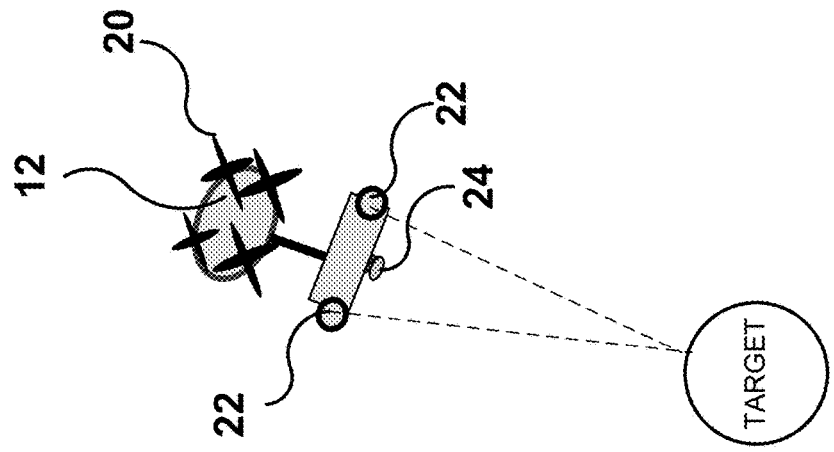
Figure 18B:
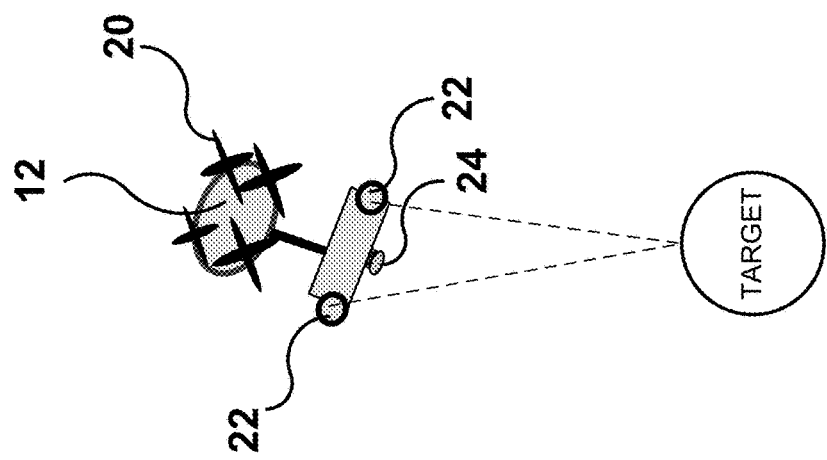
Figure 18A:
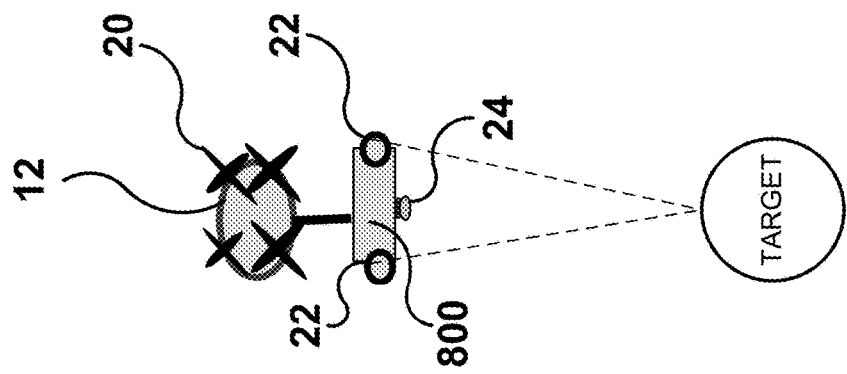

In the example approach of FIGS. 18A-C, a camera 24 and two microphones 22 are suspended below the drone on an auxiliary device 800. In one example approach, the auxiliary device 800 rotates independently of the drone body. In one such example approach two microphones 22 are attached to either side of the auxiliary device 800 and rotate with the device. FIG. 18A illustrates the positioning of the drone 12 with camera 24 facing the target. The dotted lines show the direct path of sound from the target to each microphone 22 of drone 12. Noise is overlapped with the target sound. FIG. 18B illustrates the positioning of the drone 12 of FIG. 18A with its camera 24 at an angle to the target but in the same position as the drone of FIG. 18A. The rotation of drone 12 in FIG. 18B ensures maximum separation of target sound from rotor noise but at the cost of moving the target out of the camera's view. FIG. 18C illustrates the positioning of drone 12 of FIG. 18A after it has rotated and moved with respect to the target. The rotation of drone 12 in FIG. 18C ensures maximum separation of target sound from rotor noise and the move of drone 12 ensures that the target remains in the camera's view.

Figure 19B:
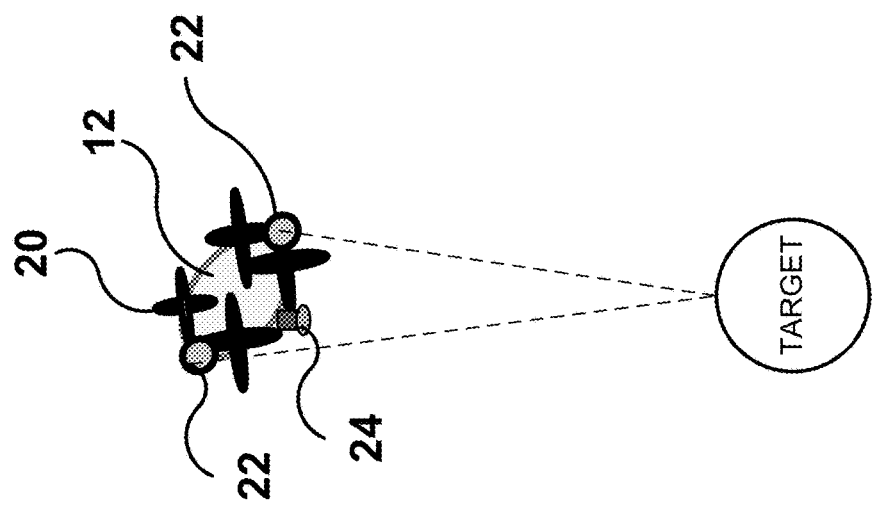
Figure 19A:
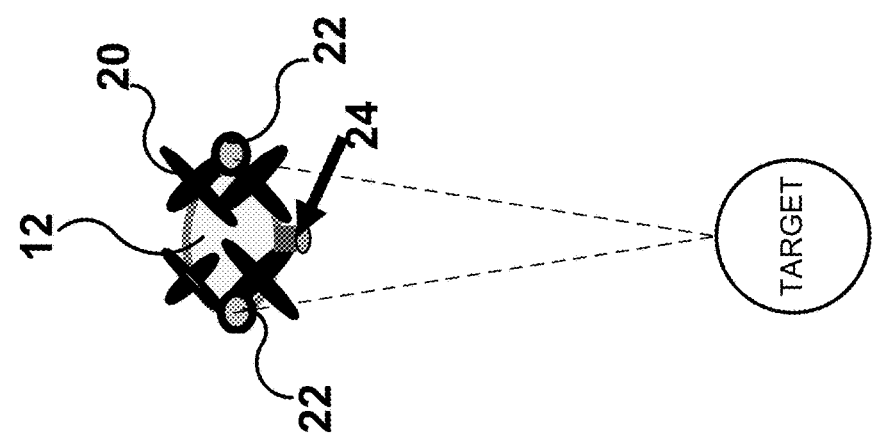

In the example approach of FIG. 19A, a camera 24 and two microphones 22 are positioned as in drone 12 of FIG. 16, but camera 24 moves about the body of drone 12 to different positions. In one such approach, camera 24 rotates in an arc around all or a portion of the body of drone 12. FIG. 19A illustrates the positioning of the drone 12 with camera 24 facing the target. The dotted lines show the direct path of sound from the target to each microphone 22 of drone 12. Noise is overlapped with the target sound. FIG. 19B illustrates the positioning of the drone 12 of FIG. 19A to ensure maximum separation of target sound from rotor noise and the repositioning of camera 24 to maintain a view of the target. The rotation of drone 12 in FIG. 19B ensures maximum separation of target sound from rotor noise and the movement of camera 24 on the body of drone 12 ensures that the target remains in the camera's view.

In one example approach, drone 12 positions microphones relative to existing audio sources to minimize interference from other sources and from self-generated noise. Drone 12 then uses beam-forming technology to further enhance the audio signal from the selected audio source.

In some situations, an audio signal from a audio source of interest may be missed if it happens to fall in the DOA of a source of self-generated noise. To combat this, in some example approaches, drone 12 may rotate microphones 22 periodically relative to the self-generated noise sources. In situations where one cannot move microphones 22 with respect to the self-generated noise sources, drone 12 may rotate itself periodically or change location or both in order to change the orientation of microphones 22 or provide multiple paths to audio sources of interest.

Figure 20A:
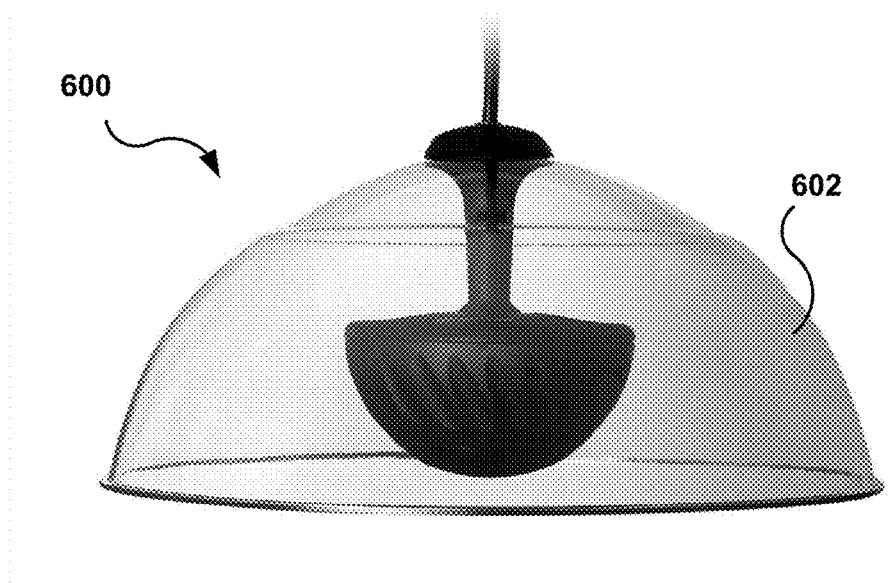
FIGS. 20A and 20B illustrate a multi-focus nested parabolic structure 600 with multi-channel audio signal output and a shared low frequency channel, in accordance with one or more techniques of this disclosure.
Figure 20B:
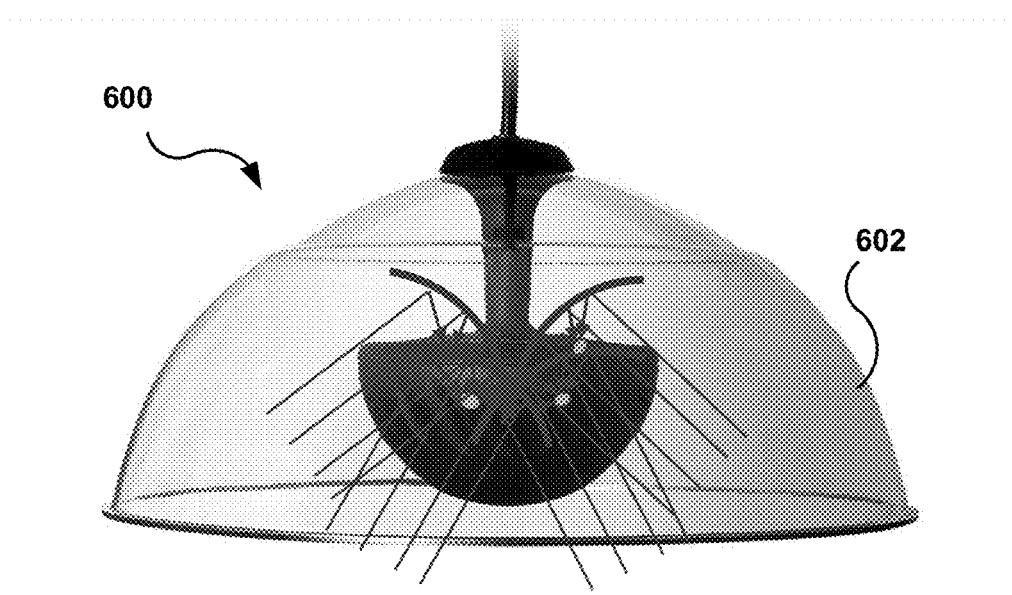

FIGS. 20A and 20B illustrate a multi-focus nested parabolic structure 600 with multi-channel audio signal output and a shared low frequency channel, in accordance with one or more techniques of this disclosure. Parabolic structure 600 includes a shield 602 used to shield a multi-channel microphone from noise from drone 12. In some example approaches, parabolic structure 600 and shield 602 are used effectively as a microphone 22 in any of the drone 12 designs discussed above. In other example approaches, parabolic structure 600 is used effectively without shield 603 as a microphone 22 in any of the drone 12 designs discussed above.

Figure 21A:
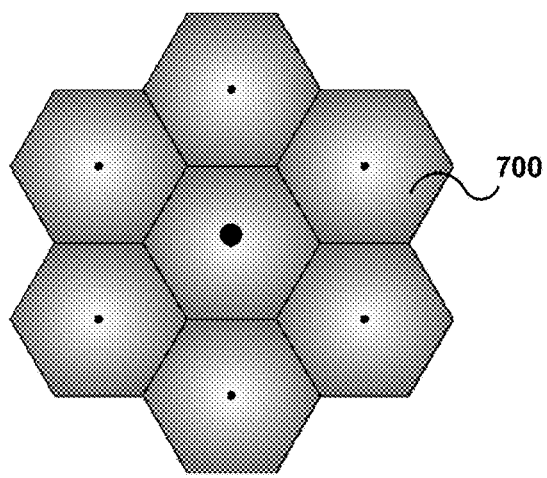
FIGS. 21A and 21B illustrate a hexagon-shaped parabolic reflection surface 700 for multi-microphone audio signal capture, in accordance with one or more techniques of this disclosure.
Figure 21B:
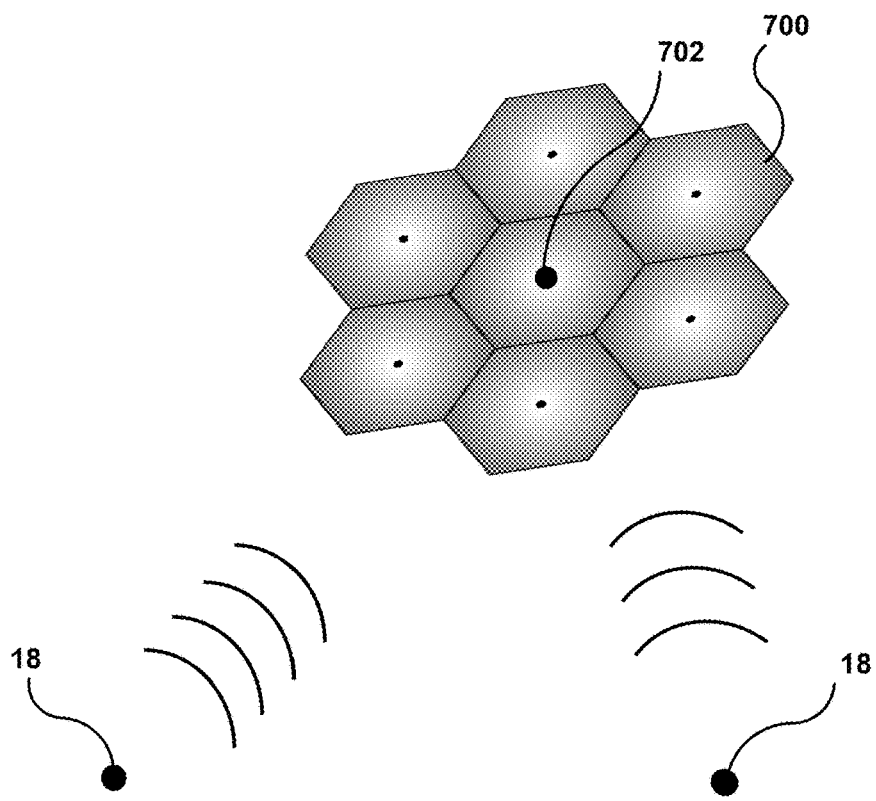

FIGS. 21A and 21B illustrate a hexagon-shaped parabolic reflection surface 700 for multi-microphone audio signal capture, in accordance with one or more techniques of this disclosure. One or more targets 18 are tracked by reflection surface 700. In one example approach, surface 700 includes a shared low frequency channel 702. In some example approaches, each microphone 22 includes a parabolic reflection surface 700 that is used for multi-microphone audio signal capture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, at a processor, audio signals via a plurality of microphones positioned relative to a location on a drone, the audio signals including audio signals emanating from a source outside the drone as well as rotor noise or wind noise;
identifying, by the processor, audio signals that are of interest from the received audio signals; and
controlling, by the processor, flight characteristics of the drone based on the audio signals that are of interest such that a signal-to-noise ratio of the audio signals that are of interest is increased.

2. The method of claim 1, wherein identifying audio signals that are of interest includes selecting audio signals received from a target of interest.

3. The method of claim 2,
wherein controlling flight characteristics of the drone includes positioning the drone relative to the rotor noise or the wind noise and to the target of interest to better capture audio signals from the target of interest in the presence of the audio signals from the rotor noise or the wind noise.

4. The method of claim 2, wherein the selected audio signals are audio signals received from an object being tracked, and
wherein controlling flight characteristics of the drone includes determining a direction of arrival (DOA) of one or more of the selected audio signals and positioning the drone based on the DOA of the one or more selected audio signals.

5. The method of claim 2,
wherein the selected audio signals are audio signals received from an object being tracked, and
wherein controlling flight characteristics of the drone includes determining a direction of arrival (DOA) of one or more of the selected audio signals and positioning the drone relative to the rotor noise or the wind noise and to the target of interest to separate the DOA of the audio signals from the object being tracked from the DOA of the audio signals from the rotor noise or the wind noise.

6. The method of claim 5, wherein the drone includes a rotor that produces the rotor noise and wherein one or more of the plurality of microphones are positioned relative to the rotor, wherein positioning the drone includes orienting the microphones and the rotor relative to the DOA of the selected audio signals.

7. The method of claim 5, wherein the drone includes a rotor that produces the rotor noise and wherein one or more of the plurality of microphones are positioned relative to the rotor, wherein positioning the drone includes moving the microphones relative to the rotor.

8. The method of claim 5, wherein the drone includes a rotor that produces the rotor noise and wherein one or more of the plurality of microphones are positioned relative to the rotor, wherein positioning the drone includes enhancing capture of the selected audio signals via beam forming.

9. The method of claim 2, wherein the selected audio signals are audio signals received from an object being tracked, and
wherein controlling flight characteristics of the drone includes following the object being tracked based on the selected audio signals.

10. The method of claim 2, wherein receiving audio signals includes positioning two or more of the plurality of microphones to perform beam forming on the selected audio signals.

11. The method of claim 10, wherein controlling flight characteristics of the drone includes following the target of interest based on the selected audio signals.

12. The method of claim 11, wherein following the target of interest includes:
measuring a magnitude of one of the selected audio signals;
determining an average magnitude based on the magnitude measured over a last pre-defined period of time; and
maintaining position of the drone relative to the object of interest to keep the average magnitude within a range of values.

13. The method of claim 1, wherein the audio signals include one or more audio signals received from an object of interest,
wherein identifying audio signals that are of interest includes transmitting, via a transmitter of the drone, data representative of one or more of the received audio signals, and
wherein controlling flight characteristics of the drone includes:
receiving, at a receiver of the drone, flight control commands, wherein the flight control commands select one or more of the audio signals received from the object of interest and instruct the drone to track the object of interest based on the selected audio signals.

14. The method of claim 13, wherein tracking the object of interest includes:
measuring a magnitude of one of the selected audio signals received from the object of interest;
determining an average magnitude based on the magnitude measured over a last pre-defined period of time; and
maintaining position of the drone relative to the object of interest to keep the average magnitude within a range of values.

15. The method of claim 13, wherein receiving flight control commands includes receiving flight commands positioning the drone relative to the rotor noise or the wind noise and to the object of interest to better capture audio signals from the object of interest in the presence of the audio signals from the rotor noise or the wind noise.

16. The method of claim 13, wherein the received audio signals include audio signals received from a rotor that produces the rotor noise, and
wherein receiving flight control commands includes receiving a command identifying drone movements needed to separate a DOA of the selected audio signals from DOAs of audio signals received from the rotor.

17. The method of claim 16, wherein the drone includes the rotor and wherein one or more of the plurality of microphones are positioned relative to the rotor, wherein receiving flight control commands includes receiving a command orienting the microphones and the rotor relative to the DOA of the selected audio signals.

18. The method of claim 16, wherein the drone includes the rotor and wherein receiving flight control commands includes receiving a command moving the microphones relative to the rotor.

19. The method of claim 1, wherein identifying audio signals that are of interest includes:
determining, by the processor, one or more audio sources that are not the rotor noise or the wind noise;
selecting an audio source from the one or more audio sources that are not the rotor noise or the wind noise; and
identifying the audio signals that are from the selected audio source.

20. The method of claim 19, wherein the selected audio source is an object being tracked, and
wherein controlling flight characteristics of the drone includes positioning the drone to keep a DOA of audio signals from the object being tracked away from DOAs of audio signals from the rotor noise or the wind noise.

21. The method of claim 20, wherein positioning the drone to follow the object being tracked includes:
measuring a magnitude of an audio signal from the object;
determining an average magnitude of the audio signal from the object as a function of a magnitude of the audio signal from the object measured over a last pre-defined period of time; and
maintaining position of the drone relative to the object being tracked to keep the average magnitude approximately constant.

22. A nonvolatile computer-readable storage medium storing instructions that, when executed, cause one or more processors to:
receive audio signals via one or more microphones positioned relative to a location on a drone, the audio signals including audio signals emanating from a source outside the drone as well as rotor noise or wind noise;
identify audio signals that are of interest from the received audio signals; and
control flight characteristics of the drone based on the audio signals that are of interest such that a signal-to-noise ratio of the audio signals that are of interest is increased.

23. A drone remote control, comprising:
at least one processor;
a receiver;
a transmitter; and
a nonvolatile computer-readable storage medium storing instructions that are executable by the at least one processor to:
receive audio signal information representing audio signals received by a drone, the audio signal information including audio signals emanating from a source outside the drone as well as rotor noise or wind noise;
identify, based on the audio signal information, one or more audio signals that are of interest from the received audio signals; and
control flight characteristics of the drone based on the audio signals that are of interest such that a signal-to-noise ratio of the audio signals that are of interest is increased.

24. The drone remote control of claim 23, wherein the drone remote control further comprises a display and an input interface, wherein the instructions further include instructions that are executable by at least one processor to display, on the display, a phase difference plot corresponding to the received audio signal information and to receive, via the input interface, an indication of one or more audio signals of interest.

25. The drone remote control of claim 23, wherein the audio signal information includes target audio signal information representative of audio signals received by the drone from a target of interest and audio signals received from a rotor that produces the rotor noise, wherein the drone remote control further comprises a display and an input interface, wherein the instructions further include instructions that are executable by at least one processor to display, on the display, an image representing aspects of the audio signal information,
wherein the instructions that are executable by the at least one processor to identify, based on the audio signal information, one or more audio signals that are of interest include instructions to receive, via the input interface, an input identifying a portion of the image that includes representations of one or more of the audio signals received by the drone from the target of interest, and
wherein the instructions that are executable by the at least one processor to control flight characteristics of the drone based on the audio signals that are of interest include instructions to form flight commands, wherein the flight commands, when received by a drone, instruct the drone to orient the drone relative to the rotor and to the target of interest to better capture audio signals from the target of interest in the presence of the audio signals from the rotor.

26. A drone, comprising:
a processor;
a plurality of microphones;
a receiver;

a transmitter; and a nonvolatile computer-readable storage medium storing instructions that are executable by the processor to:

receive audio signals via the microphones, the audio signals including audio signals emanating from a source outside the drone as well as rotor noise or wind noise;

identify audio signals that are of interest from the received audio signals; and control flight characteristics of the drone based on the audio signals that are of interest such that a signal-to-noise ratio of the audio signals that are of interest is increased.

27. The drone of claim 26, wherein one or more of the microphones are movable around the drone under control of the processor.

28. The drone of claim 26, wherein the drone further comprises a camera, wherein the microphones are positioned relative to the camera and relative to a rotor that produces the rotor noise for approximately maximum separation from the rotor when the camera is pointing at a target of interest.

\* \* \* \* \*